(12) United States Patent
Kawamura et al.

(10) Patent No.: US 6,691,920 B1
(45) Date of Patent: Feb. 17, 2004

(54) RECORDING AND/OR REPRODUCING DEVICE AND METHOD FOR LOADING STORAGE MEDIUM

(75) Inventors: Asako Kawamura, Chiba (JP); Masaaki Ohara, Saitama (JP); Taizo Ogawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/830,099

(22) PCT Filed: Aug. 18, 2000

(86) PCT No.: PCT/JP00/05560

§ 371 (c)(1),
(2), (4) Date: Jul. 19, 2001

(87) PCT Pub. No.: WO01/15069

PCT Pub. Date: Mar. 1, 2001

(30) Foreign Application Priority Data

Aug. 24, 1999 (JP) .......................................... 11-237622
Dec. 9, 1999 (JP) .......................................... 11-350860

(51) Int. Cl.[7] .............................................. G06K 19/06

(52) U.S. Cl. ..................................... 235/492; 235/487

(58) Field of Search ................................. 235/492, 487

(56) References Cited

U.S. PATENT DOCUMENTS 6,208,044 B1 * 3/2001 Viswanadham et al. ..... 235/492

FOREIGN PATENT DOCUMENTS

| JP | 3110566 | 11/1991 |
|---|---|---|
| JP | 10111917 | 4/1998 |
| JP | 10178691 | 6/1998 |
| JP | 10198772 | 7/1998 |
| JP | 1152998 | 2/1999 |
| JP | 1195867 | 4/1999 |
| JP | 11163984 | 6/1999 |
| JP | 11237622 | 8/1999 |
| JP | 11282500 | 10/1999 |
| JP | 11296199 | 10/1999 |
| JP | 11350860 | 12/1999 |

* cited by examiner

Primary Examiner—Harold I. Pitts
(74) Attorney, Agent, or Firm—Jay H. Maioli

(57) ABSTRACT

A recording and reproducing apparatus employing a flat, plate-shaped memory as a recording medium. The apparatus includes a selection operation unit for selecting data stored in the memory located at an end of a main body portion of the apparatus, where the memory is detachably loaded. The apparatus also includes an ejection unit located at an end opposing the selection operation unit for ejecting the loaded memory, thereby to prevent mistaken operations in data selection and memory ejection.

66 Claims, 24 Drawing Sheets

RECORDING AND/OR REPRODUCING DEVICE AND METHOD FOR LOADING STORAGE MEDIUM

DESCRIPTION

Recording and/or Reproducing Apparatus and Method for Loading of Recording Medium 1. Technical Field This invention relates to a recording and/or reproducing apparatus employing a plate-shaped memory as a recording medium. More particularly, it relates to a recording and/or reproducing apparatus having a plate-shaped memory removably loaded thereon, and a method for loading a memory on this apparatus.

2. Background Art

Up to now, as a recording and/or reproducing apparatus enclosed in a personal computer or in an audio visual equipment, or as a recording and/or reproducing apparatus used as an external memory for these apparatus or equipment, such an apparatus employing a magnetic disc or an optical disc as a recording medium is in widespread use.

On the other hand, as an apparatus for recording and/or reproducing the audio or video information, such an apparatus employing a magnetic tape, a magnetic disc or an optical disc as a recording medium, is in use.

In this sort of the recording and/or reproducing apparatus, such apparatus has been proposed in which a plate-shaped memory provided with a solid memory, such as a flash memory, or an IC, and having a further reduced size, is used as a recording medium. The plate-shaped memory, employing the solid memory, can be of a reduced size despite its large recording capacity, thereby enabling the recording and/or reproducing apparatus employing this memory to be further reduced in size.

The recording and/or reproducing apparatus, employing a memory employing in turn a solid memory, as a recording medium, can be further reduced in size in keeping with a memory which can be reduced in size sufficiently as compared to a tape cassette or a disc cartridge.

If the recording and/or reproducing is reduced in size, an operating unit for selecting the operating mode of this apparatus, an ejecting device for ejecting a memory loaded on a main body portion of the apparatus and so forth, can be mounted in proximity to one another.

If these plural operating units are mounted in proximity to one another, one is liable to make an erroneous operation. If, when the recording and/or reproducing operating mode is selected, the ejecting device is erroneously selected, so that the memory is ejected, not only can the information not be recorded correctly, but also the information recorded on the memory tends to be destroyed.

DISCLOSURE OF THE INVENTION

It is therefore an object of the present invention to provide a recording and/or reproducing apparatus which enables the recording and/or reproducing apparatus to be reduced further in size while also enabling the apparatus to be improved in tractability through the use of a plate-shaped memory.

It is another object of the present invention to provide a recording and/or reproducing apparatus which can be reduced in size and in which mistaken operations of the apparatus may be eliminated to assure correct recording and/or reproduction of information signals.

For accomplishing the above objects, the present invention provides a recording and/or reproducing apparatus including a main body portion of the apparatus on which a recording medium is removably loaded, a selection operation unit provided at a position towards one end from a mid portion of the main body portion of the apparatus for selecting at least data stored in the recording medium, a reproducing unit for reproducing the data selected by the selection actuation portion, and an ejection unit provided at a position towards the opposite end from the mid portion of the main body portion of the apparatus for ejecting a recording medium loaded in the main body portion of the apparatus, in order to prevent mistaken operations in data selection and memory ejection.

The selection operation unit for selecting the operating mode is moved in a direction of emerging from and receding into the inside of the main body portion of the apparatus, and is rotated relative thereto, with the ejection unit being moved parallel to one surface of the main body portion of the apparatus.

The ejection unit is moved in a direction of inserting the memory into the main body portion to eject the memory from the main body portion.

The memory insertion/ejection opening, via which the memory is inserted and ejected, is provided on the opposite end of the main body portion of the apparatus. The memory is inserted from the opposite end towards one end of the main body portion of the apparatus.

On one surface of the main body portion of the apparatus, there is provided a window via which at least a portion of one surface of the memory inserted into the holder is exposed to outside. This window is closed by a light- to dark-colored transparent plate formed integrally with the main body portion of the apparatus to render the window less apparent.

Other objects, features and advantages of the present invention will become more apparent from the following detailed description of the present invention and the claims.

BEST MODE FOR CARRYING OUT THE INVENTION

Figure 1:
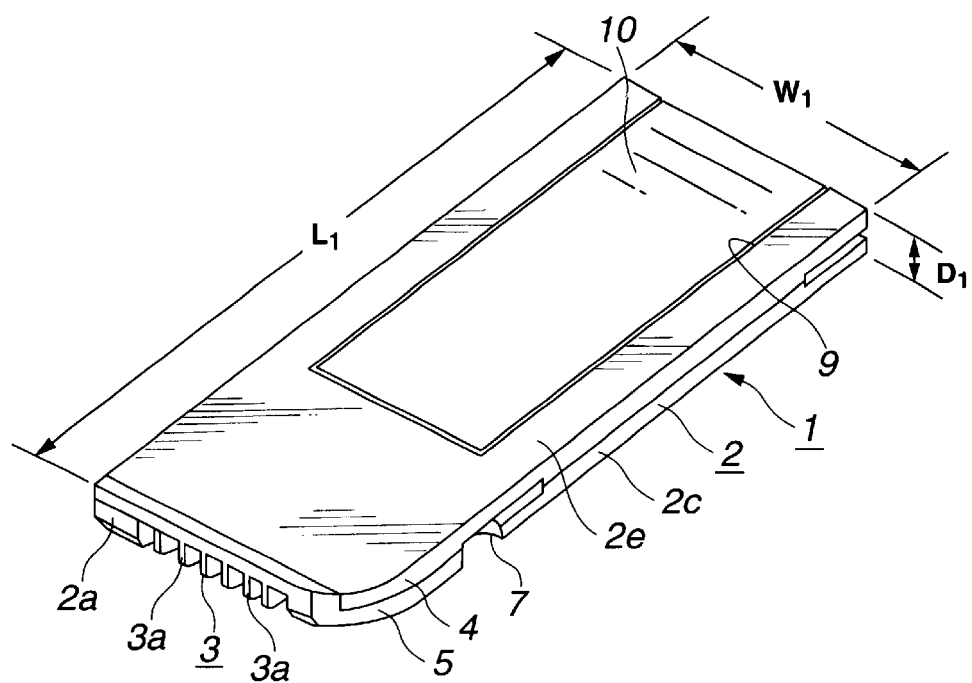
FIG. 1 is a perspective view showing a plate-shaped memory used in a recording and/or reproducing apparatus according to the present invention and FIG. 2 is a perspective view showing the bottom surface of the plate-shaped memory.

Referring to the drawings, a recording and/or reproducing apparatus, employing a plate-shaped memory according to the present invention, is hereinafter explained.

Figure 2:
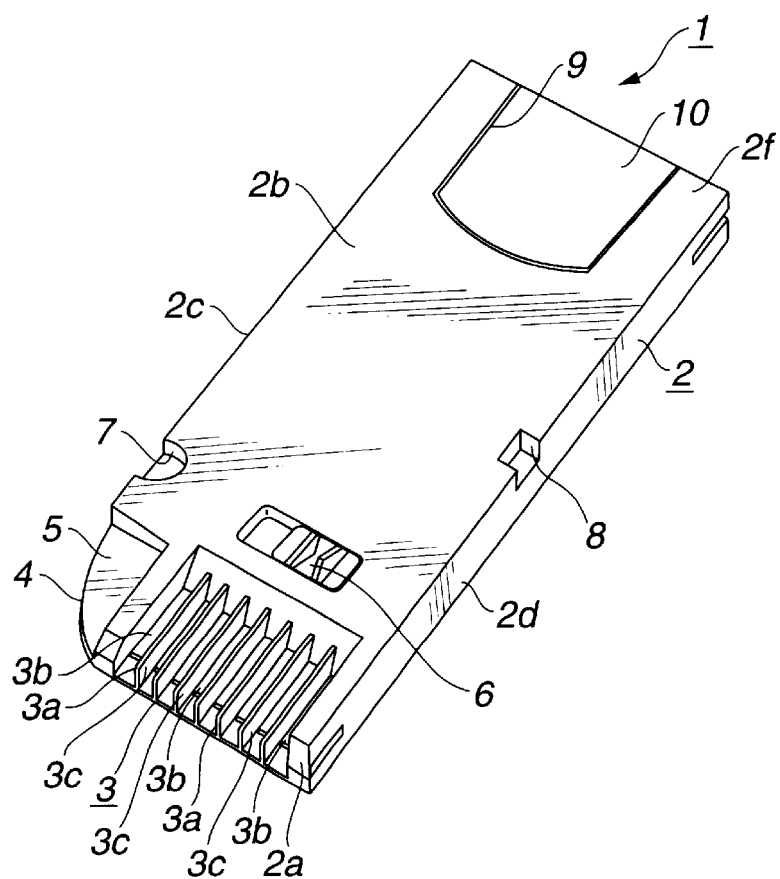

The recording and/or reproducing apparatus according to the present invention uses a plate-shaped memory 1, shown in FIGS. 1 and 2, as a recording medium. This plate-shaped memory 1 includes a casing 2, making up a memory main member molded from synthetic resin, and a memory device, such as a flash memory, having a large storage capacity of, for example, 32 Mbytes or more, within the casing 3. The plate-shaped memory 1 is of a substantially rectangular shape with a length W1 of the short side being approximately 21.45 mm, a length L1 of the long side being approximately 50 mm and with the thickness D1 being approximately 2.8 mm.

On one short side of the casing 2, forming the plate-shaped memory 1, there is formed a terminal unit 3 for extending from the front side 2a to the bottom surface 2b, as shown in FIGS. 1 and 2. On this terminal unit 3, there are provided plural electrodes 3b, separated from one another by partitioning wall sections 3a. The operations of reading out or writing the information from or on the memory device provided in the casing 2 is via an electrode 3b provided on the terminal unit 3. With the partitioning wall sections 3a defining engagement recesses 3c, and with the electrodes 3b being mounted on the bottom surfaces of the engagement recesses 3c, the terminal unit 3 is protected against direct contact of hand or finger of the user.

In one corner of the front surface 2a of the casing 2, carrying the terminal unit 3, there is defined an arcuate cut-out 4, indicating the direction of insertion into the recording and/or reproducing apparatus, as shown in FIGS. 1 and 2. In a lateral surface 2c of the casing 2, carrying the arcuate cut-out 4, there is formed a mistaken insertion preventative groove 5 by laying the bottom surface 2b of the casing 2 open in continuation to the cut-out 4, as shown in FIG. 2. This arcuate cut-out 4 and the mistaken insertion preventative groove 5 serve for managing the direction of insertion into the recording and/or reproducing apparatus, when mounting the plate-shaped memory 1 in the recording and/or reproducing apparatus, to prevent mistaken insertion.

On the bottom surface 2b of the casing 2, there is provided, in the vicinity of the terminal unit 3, a mistaken recording preventative switch 6 for preventing information signals from being erroneously recorded on a semiconductor memory. The mistaken recording preventative switch 6 is coupled to an operating knob in the casing 2 so that, when slid in one or in the other direction, the switch enables recording of information signals or prevents overwriting of new information signals, respectively. In a lateral surface 2c of the casing 2, there is formed a detachment preventative recess 7 adapted for being engaged by an engagement holder provided on the recording and/or reproducing apparatus to prevent inadvertent detachment of the casing 2 from the recording and/or reproducing apparatus when the casing is once introduced therein. At a mid portion of the opposite side lateral surface 2d of the casing 2 is formed an engagement recess 8 for loading detection. This engagement recess 8 is engaged by a detection unit provided on the recording and/or reproducing apparatus to detect the loading/unloading of the plate-shaped memory 1 on or from the recording and/or reproducing apparatus.

The casing 2 of the plate-shaped memory 1 is provided with a label affixing area 9 for extending from a planar surface 2e through the back surface 2f to the bottom surface 2b, as shown in FIGS. 1 and 2. The label affixing area 9 is formed as a recess extending from the planar surface 2e through the back surface 2f to the bottom surface 2b of the casing 2. The label affixing area 9 is of such a depth that, when the label 10 is affixed in the label affixing area 9, the label 10 is not protruded from or is flush with the outer peripheral surface of the casing 2. The planar surface 2e of the label affixing area 9 extends from the back surface 2f to the vicinity of the front surface 2a of the casing 2, as shown in FIG. 1. On the label 10 affixed to the label affixing area 9, there is provided a display showing machine types that can use the plate-shaped memory 1 or the recording contents of the plate-shaped memory 1.

A recording and/or reproducing apparatus 11, employing the above-described plate-shaped memory 1 as a recording medium, includes a microphone and a loudspeaker, and records/reproduces information signals, such as audio data, on or from the plate-shaped memory 1. This recording and/or reproducing apparatus 11 includes a housing 12, constituting a main body portion of the apparatus, obtained on abutting and interconnecting an upper housing half 12a and a lower housing half 12b, both formed on molding a synthetic resin material, as shown in FIGS. 3 and 4.

Figure 3:
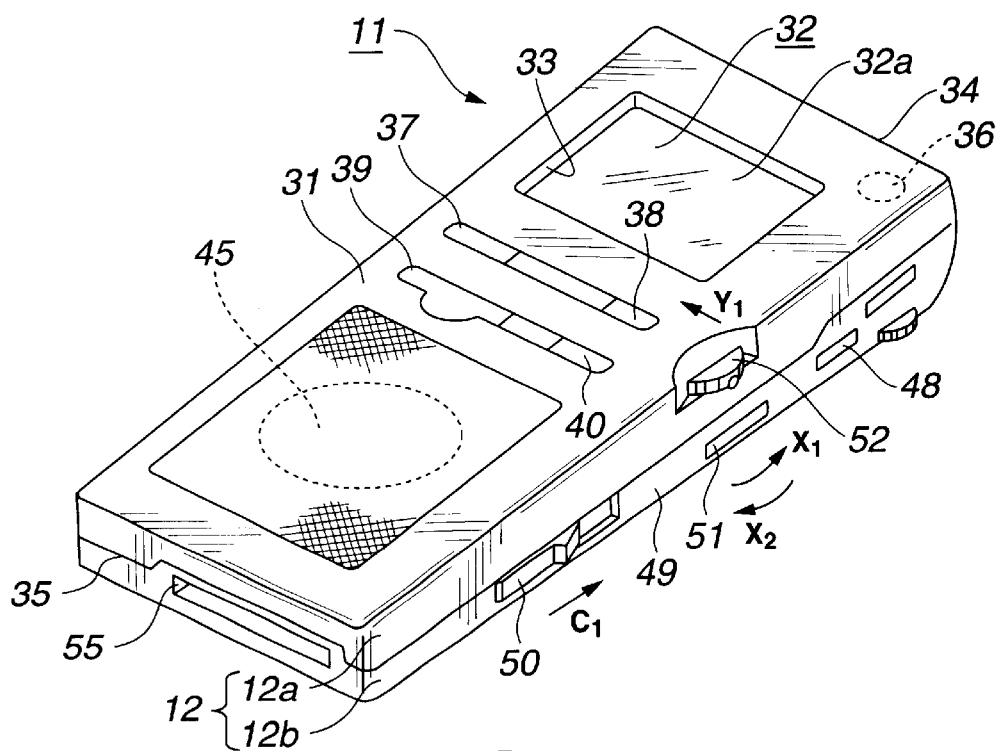
FIG. 3 is a perspective view showing the recording and/or reproducing apparatus of the present invention as viewed from its rear side and FIG. 4 is a perspective view showing the recording and/or reproducing apparatus of the present invention as viewed from its front side.
Figure 4:
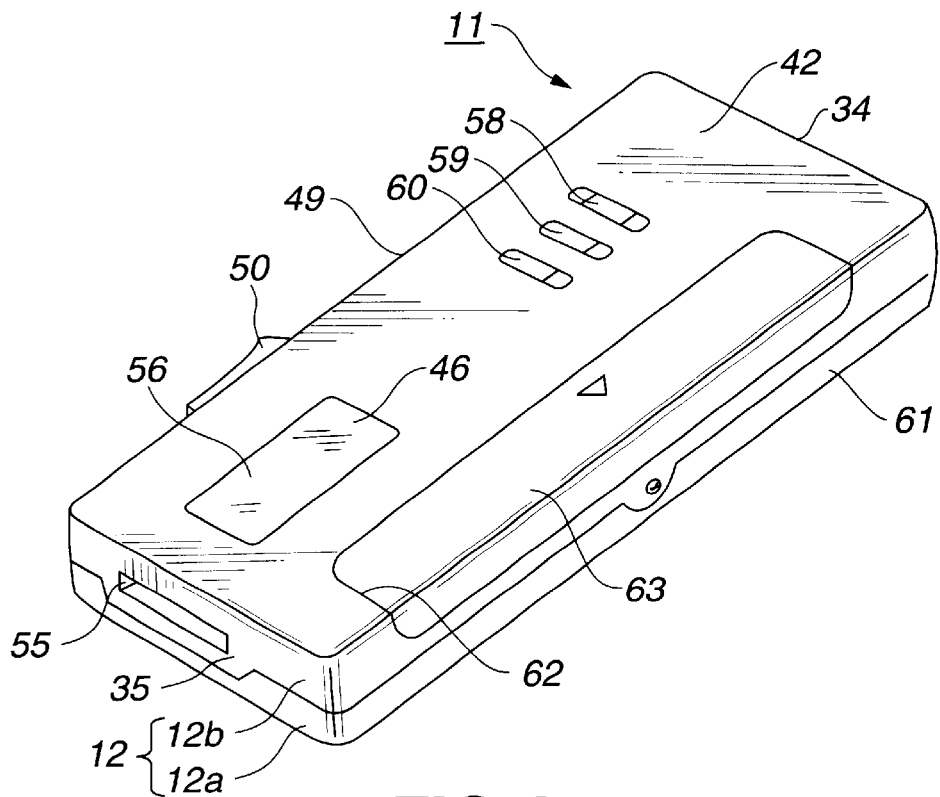

On a planar surface 31 of the housing 12 is formed a first window 33 adapted for exposing the display surface 32a of the display member 32 formed as a liquid crystal member mounted in the housing 12 to outside, as shown in FIG. 3. The first window 33 is provided towards one end of the housing 12 lying towards the front surface 34 from a longitudinal mid portion thereof extending from the front surface 34 to the rear surface 35. The first window 33 is covered by a transparent synthetic resin sheet exhibiting light transmission properties.

In the vicinity of one corder towards the front surface 34 of the housing 12, there is provided a microphone 36 for collecting the external sound. At a mid portion on the planar surface 31 of the housing 12, there are provided a menu selection button 38 for demonstrating e.g., an operating mode on the display member 32, a stop button 39 for stopping the recording or reproducing mode, and an erasure button 40 for erasing recording contents in the plate-shaped memory 1 loaded on the recording and/or reproducing apparatus 11.

On the planar surface 31 of the housing 12, there is provided a loudspeaker unit 45, as shown in FIG. 3. The loudspeaker unit 45 is provided towards the opposite end lying closer to the rear surface 35 from a mid portion of the longitudinal length extending from the front surface 34 to the rear surface 35 of the housing 12.

On one lateral surface 49 of the housing 12, there is provided a selection operating unit 52 for selecting the operating mode of the respective apparatus 11. The selection operating unit 52 is provided towards one end lying closer to the front surface 34 from a mid portion of the longitudinal length extending from the front surface 34 to the rear surface 35 of the housing 12. This selection operating unit 52 is rotated in the direction indicated by arrow X1 and in the direction opposite to that indicated by arrow X1 in FIG. 3 to select the operating mode such as the recording mode or the reproducing mode of the recording and/or reproducing apparatus 11. The selection operating unit 52 is also thrust in the direction perpendicular to the lateral surface 49 of the housing 12 as indicated by arrow Y1 in FIG. 3 to decide the selected operating mode.

At a mid portion along the longitudinal length of the lateral surface 49 of the housing 12 provided to the selection operating unit 52, there is provided a hold button 51 for fixing the selected operating mode. On this lateral surface 49, there is also provided a recording start button 48 for recording audio data on the plate-shaped memory 1 loaded on the recording and/or reproducing apparatus 11.

On the lateral surface 49 of the housing 12, there is also provided an ejection unit 50 for ejecting the plate-shaped memory 1 loaded on this recording and/or reproducing apparatus 11. This ejection unit 50 is provided on the opposite side lying closer to the rear surface 35 from a mid portion along the longitudinal length of the housing 12 from the front surface 34 to the rear surface 35. This ejection unit 50 is moved in the direction of insertion of the plate-shaped memory 1 into the recording and/or reproducing apparatus 11 as indicated by arrow C1 in FIG. 3 to eject the plate-shaped memory 1 loaded in the recording and/or reproducing apparatus 11.

In the rear surface 35 of the housing 12, there is provided a memory insertion/ejection opening 55 through which to insert or eject the plate-shaped memory 1 loaded on the recording and/or reproducing apparatus 11, as shown in FIG. 3. The plate-shaped memory 1 is introduced into the inside of the respective apparatus 11, with the front surface 2a carrying the terminal unit 3 as an inserting end, in a direction parallel to the planar surface 31 of the housing 12 from the rear surface 35 towards the front surface 34 of the housing 12.

In the bottom surface 42 of the housing 12, there is formed a second window 56 for exposing at least a portion of the label affixing area 9 provided on the planar surface 2e of the plate-shaped memory 1 loaded in the recording and/or reproducing apparatus 11 or the label 10 attached to the label affixing area 9. This second window 56 is provided towards the opposite end lying towards the rear surface 35 from a mid portion along the longitudinal length of the housing 21 extending from the front surface 34 to the rear surface 35, as shown in FIG. 4. This second window 56 is covered by a light- to dark-colored see-through plate 46 to render the contents of the label 10 less outstanding when seen from outside.

On the bottom surface 42 of the housing 12, there are provided a replay speed controlling button 58 for controlling the playback speed of the recording and/or reproducing apparatus 11, a microphone controlling button 59 for controlling the microphone sensitivity, and a sound volume controlling button 60 for controlling the sound volume or the playback sound volume input from the microphone, as shown in FIG. 4.

From the bottom surface 42 to an opposite lateral surface 61, there is provided a cell housing unit 62 for housing a cell furnishing the driving power source for the recording and/or reproducing apparatus 11. The cell housing unit 62 is covered by an openable cell lid 63.

Meanwhile, the plate-shaped memory 1, inserted through the memory insertion/ejection opening 55 into the housing 12, is loaded by a loading device in position in the recording and/or reproducing apparatus 11. This loading device includes a holder 13, in which to introduce and accommodate the plate-shaped memory 1, and a chassis 14, on which to mount the holder 13, with the holder 13 being movable with respect to the chassis 14, as shown in FIGS. 5 and 6.

Figure 5:
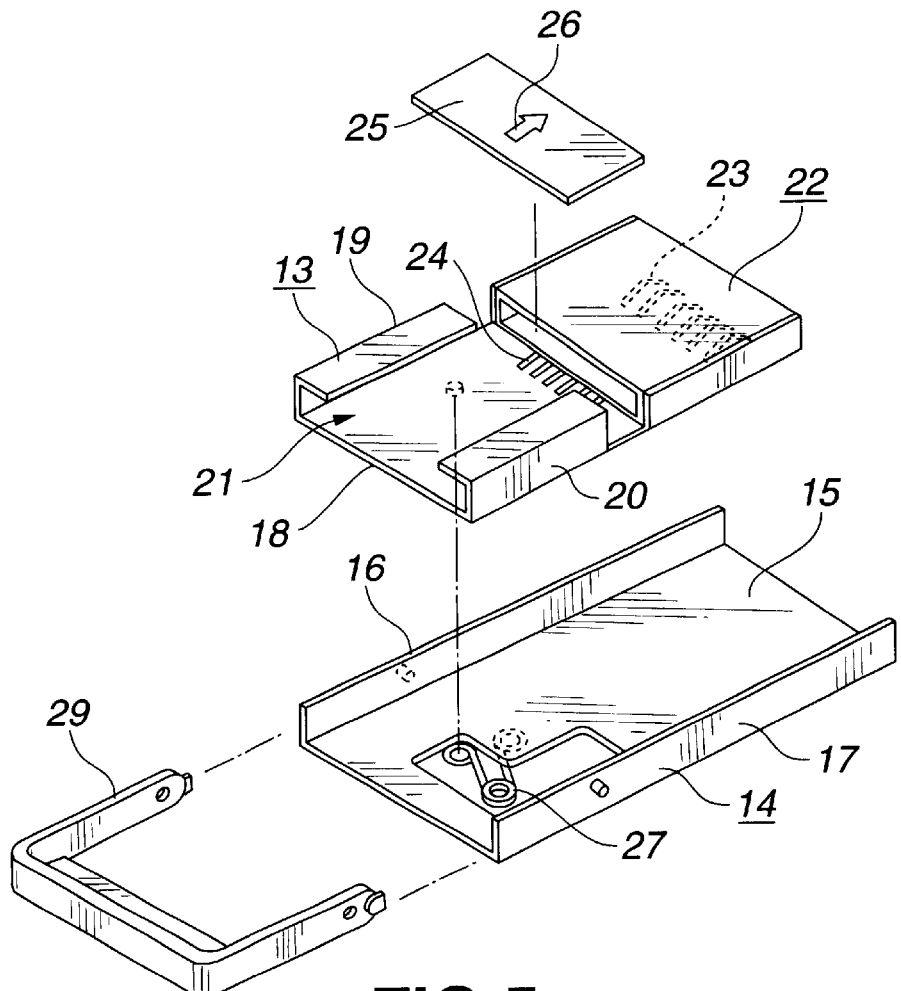
FIG. 5 is a perspective view showing a holder of the recording and/or reproducing apparatus according to the present invention and FIG. 6 is a perspective view showing the holder as mounted on a chassis.
Figure 6:
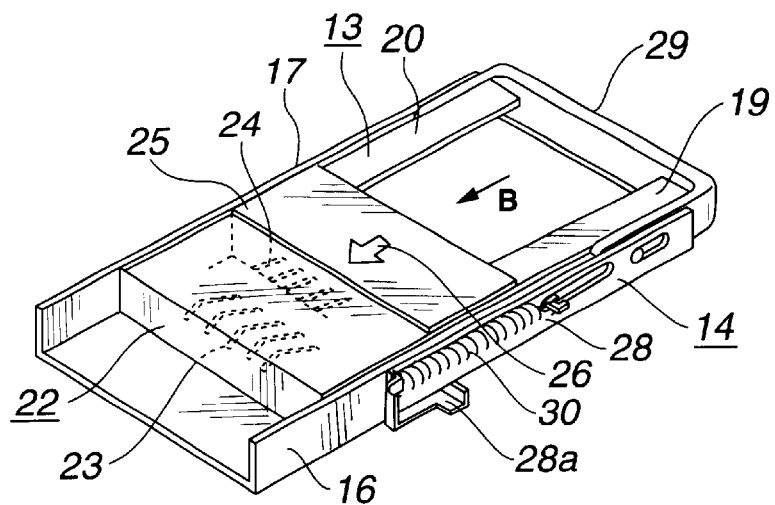

The chassis 14, on which the holder 13 is movably mounted, is formed to have a U-shaped cross-section, with first and second sidewall sections 16, 17 being formed on both facing lateral sides of the bottom plate 15, as shown in FIG. 5.

The holder 13, movably mounted on the chassis 14, is provided with first and second memory holding portions 19, 20 on both facing lateral sides of a memory support plate 18 supporting the plate-shaped memory 1, as shown in FIG. 5. The space between the first and second memory holding portions 19, 20, operating as an upper surface of the holder 13, is laid open to expose to outside the label affixing area 9 provided on the planar surface 2e of the plate-shaped memory 1 loaded into the space between the first and second memory holding portions 19, 20. The holder 13 has its one opened side operating as an insertion/ejection opening 21 for the plate-shaped memory 1 loaded/unloaded into or from the holder 13. In the other end of the holder 13, opposite to its side carrying the insertion/ejection opening 21, there is mounted a connector 22 to which is electrically connected the terminal unit 3 provided on the plate-shaped memory 1 inserted into the holder 13. The connector 22 is provided with a first connection terminal 23, made up of plural terminals, electrically connected to plural electrodes 3b, forming the terminal unit 3 of the plate-shaped memory 1, as shown in FIG. 5. The connection terminal 23 is provided on the inner end of the connector 22. The connector 22 is also provided with a second connection terminal 24, as protruding towards the holder 13. The second connection terminal 24 is comprised of plural terminals for exchanging the information signals recorded on the plate-shaped memory 1 between a signal processing circuit provided in the recording and/or reproducing apparatus 11 and a memory within the plate-shaped memory 1.

On the upper surface side of the connector 22, there is provided a cover plate 25 for overlying a second connection terminal 24 protruding towards the holder 13 for facing outwards from the connector 22. When the holder 13 is mounted within the housing 12, the cover plate 25 is exposed to outside via a second window 56 provided in the bottom 42 of the housing 12. On the surface of the cover plate 25, there is provided a display mark 26, such as by printing or scoring, for indicating the direction of insertion of the plate-shaped memory 1 into the holder 13 as well as the presence or absence of the loaded plate-shaped memory 1.

The holder 13, constructed as described above, is mounted on the bottom plate 15 of the chassis 14 for movement in the direction indicated by arrow B in FIG. 6 and in the reverse direction thereto. The holder 13 has its movement guide shaft, not shown, engaged in and supported by a movement guide opening provided in the chassis 14 to prevent its detachment from the chassis 14 and is mounted for movement on the bottom plate 15 in the direction indicated by arrow B in FIG. 6 and in the reverse direction thereto.

Between the holder 13 and the chassis 14 is mounted a toggle spring 27. In the initial state of the holder 13, enabling the insertion/ejection of the plate-shaped memory 1 into or from the recording and/or reproducing apparatus 11, the plate-shaped memory 1 is introduced into the holder 13 and moved in the direction opposite to that indicated by arrow B in FIG. 6. If the holder 13 is moved further to a mid portion of the chassis 14, the biasing direction of the toggle spring 27 is reversed. So, the holder is further moved in the direction opposite to that indicated by arrow B in FIG. 6, under the force of the toggle spring 27, up to the pre-set memory mounting position within the recording and/or reproducing apparatus 11.

If the holder 13 is moved in the direction opposite to that indicated by arrow B in FIG. 6, as from the state in which the holder has been moved to its loading position, the biasing direction of the toggle spring 27 is reversed. So, the holder is further moved in the direction opposite to that indicated by arrow B in FIG. 6, under the force of the toggle spring 27, up to a loading/unloading position enabling the loading/unloading of the plate-shaped memory 1.

The holder 13, into which the plate-shaped memory 1 has been introduced, and which has been moved to the memory loading position in the recording and/or reproducing apparatus 11, is moved in the direction opposite to that indicated by arrow B in FIG. 6, up to the loading/unloading position, by an ejection member 28 being moved in the direction indicated by arrow B in FIG. 6. The ejection member 28 is movably supported on the first sidewall section 16 of the chassis 14. The ejection member 28, moved in the same direction as the direction of introducing the plate-shaped memory 1 into the holder 13 to eject the plate-shaped memory 1 inserted and held in the holder 13, optimizes the operating feeling in ejecting the plate-shaped memory 1.

Meanwhile, the ejection member 28 is biased into movement in the direction opposite to that indicated by arrow B in FIG. 6, under the force of a tension spring 30 provided between the ejection member 28 and the first sidewall section 16 of the chassis 4.

On one end of the chassis 14, faced by the insertion/ejection opening 21 of the holder 13, there is rotatably mounted a lid 29 adapted for opening and closing the insertion/ejection opening 21. The lid 29 is rotationally biased in a direction normally closing the insertion/ejection opening 21, by a biasing member, not shown. The lid 29 is also operatively linked to the movement of the ejection member 28 in the direction indicated by arrow B in FIG. 6 so as to be rotated against the force of the biasing member in the direction of opening the insertion/ejection opening 21.

The plate-shaped memory 1 is introduced into the holder 13, with the planar surface 2e directing upwards and with the front side 2a carrying the terminal unit 3 as the inserting end. So, if the plate-shaped memory 1 is introduced into the holder 13, the label affixing area 9 provided on the planar surface 2e faces to outside via the opened area between the first and second paired memory holding portions 19, 20.

The holder 13, movably mounted on the chassis 14 as described above, is mounted within the housing 12, with the insertion/ejection opening 21 facing a memory insertion/ejection opening 55 provided in the back surface 35 of the housing 12. The holder 13 then is mounted in the housing 12, so that the opened portion between the paired first and second memory holding portions 19, 20 on its upper side will be positioned towards the bottom surface 42 of the housing 12. The holder 13 is mounted in the housing 12, with an opened portion in its upper surface facing the bottom surface 42 of the housing 12, so that the opened portion faces outwardly of the housing 12 through the second window 56 formed in the housing 12 with the plate-shaped memory 1 inserted into the holder 13 also facing outwardly through the second window 56.

Figure 7:
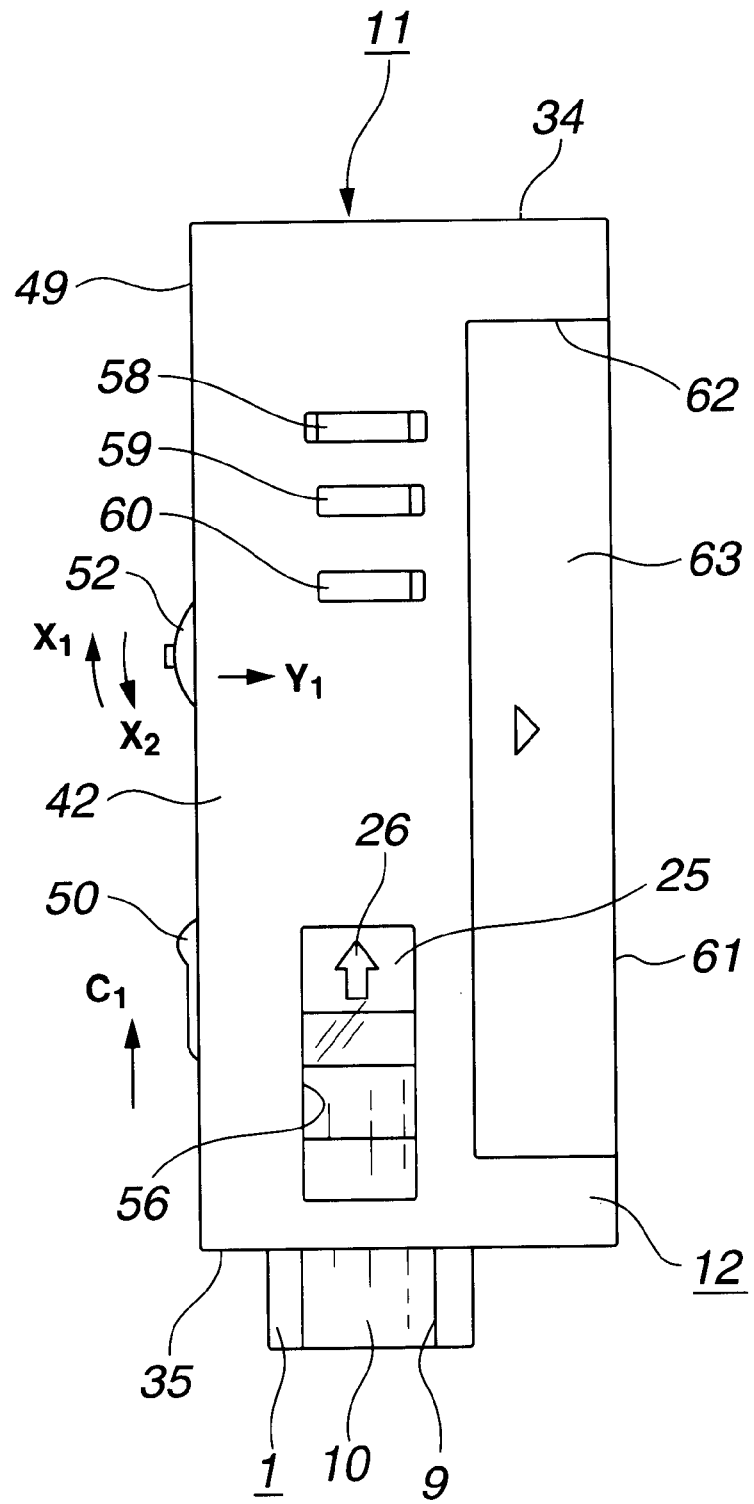
FIG. 7 is a plan view showing the state of insertion of a plate-shaped memory into the recording and/or reproducing apparatus according to the present invention.
Figure 8:
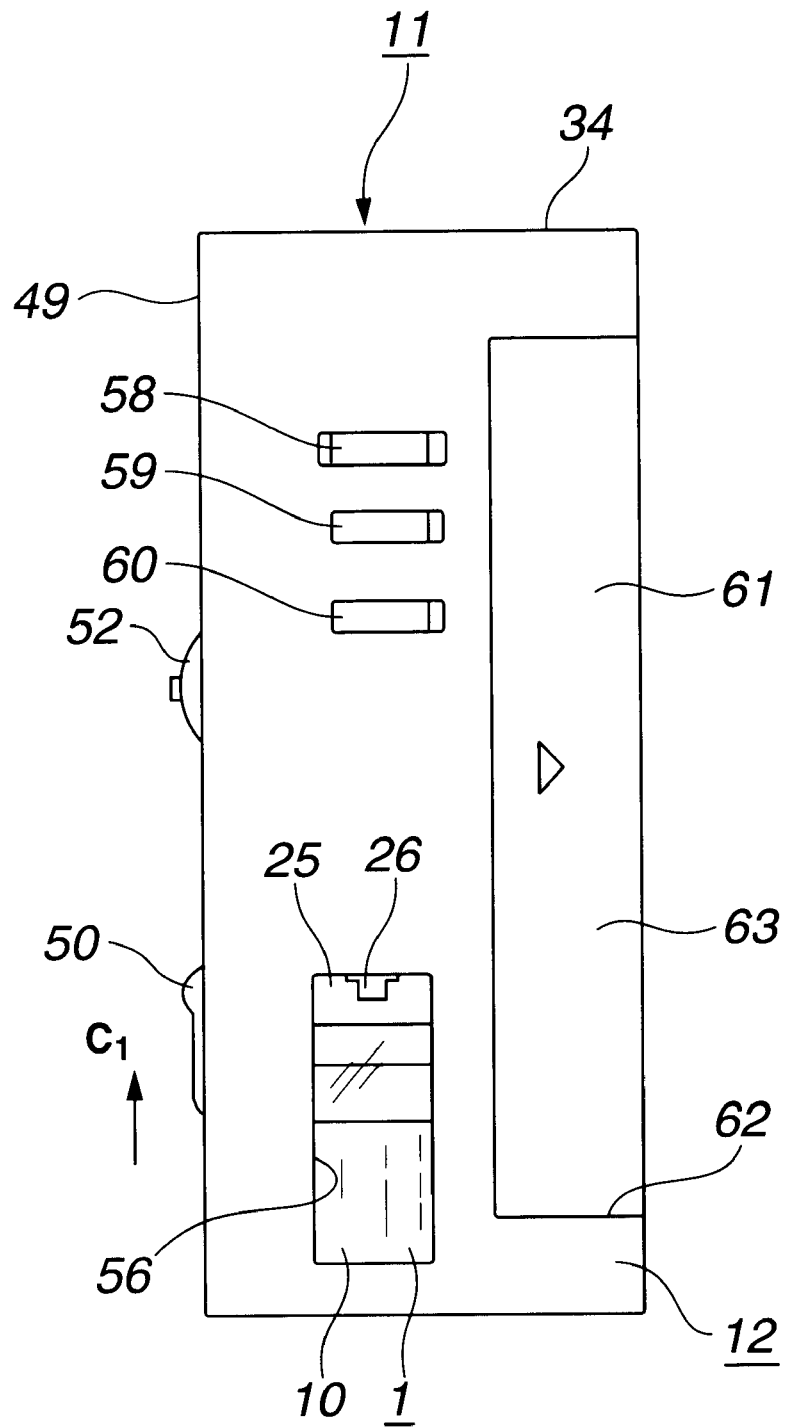
FIG. 8 is a plan view showing the state in which a plate-shaped memory is loaded on the recording and/or reproducing apparatus according to the present invention.

The second window 56 is formed as an elongated rectangular opening for exposing the opened area between the paired first and second memory holding portions 19, 20 on the upper surface of the holder 13, and the cover plate 25 overlying the second connection terminal 24 of the connector 22, to outside of the housing 12, as shown in FIGS. 7 and 8. With the so-shaped second window 56, the label affixing area 9 provided on the planar surface 2e of the plate-shaped memory 1 introduced into the holder 13 is exposed to outside via the second window 56, thus allowing the user to view the display on the label 10 affixed to the label affixing area 9 from outside the housing 12 to check the type of the loaded plate-shaped memory 1 or the contents of the information recorded on the plate-shaped memory 1, as the plate-shaped memory 1 is loaded in position on the recording and/or reproducing apparatus 11. Simultaneously, the display mark 26, provided on the cover plate 25, is exposed to outside via the second window 56 to permit the user to view the display 26 from outside the housing 12.

Meanwhile, the cover plate 25, provided on a connector 22 moving with the holder 13, is moved in the second window 56, along with the holder 13, in conjunction with the insertion/ejection of the plate-shaped memory 1. By setting the size of the second window 56 so that the amount of the cover plate 25 facing the second window 56 is varied depending on the position of movement of the holder 13, the facing state of the display mark 26 of the cover plate 25 to the second window 56 can be varied. By the display mark 26, it can readily be discriminated whether the plate-shaped memory 1 has been inserted into the holder 13 or the holder 13 is in a state enabling the insertion of the plate-shaped memory 1. That is, if the holder 13 is in proximity to the memory insertion/ejection opening 55 provided in the rear surface 35 of the housing 12 enabling the insertion/ejection of the plate-shaped memory 1, as shown in FIG. 7, the display mark 26 comprising an arrow provided on the cover plate 25 for indicating the direction of insertion faces in its entirety to the outside of the housing 12. By setting the size of the second window 56 so that a pointed portion of the arrow of the display mark 26 is hidden when the holder 13 has been moved to a position of loading the plate-shaped memory 1 inserted and held in the holder 13 in the loading position in the recording and/or reproducing apparatus 11, as shown in FIG. 8, the user is able to verify readily the state of insertion of the plate-shaped memory 1 into the holder 13.

The holder 13 is mounted in the housing 12 so that the opened area between the paired first and second memory holding portions 19, 20 on the upper surface thereof will face the second window 56. The ejection member 28 provided on the first sidewall section 16 is located towards the lateral surface 49 of the housing 12. An operating portion 28a provided on the ejection member 28 is protruded towards the lateral surface 49 of the housing 12 into engagement with the ejection member 50 mounted on the lateral surface 49 for movement in the direction indicated by arrow C1 and in the direction opposite to that indicated by arrow C1 in FIG. 3. When the ejection member 50 is moved in the direction of introducing the plate-shaped memory 1 into the recording and/or reproducing apparatus 11, as indicated by arrow C1 in FIG. 3, the plate-shaped memory 1, inserted and held in the holder 13, is protruded outwardly of the recording and/or reproducing apparatus 11 by way of performing the ejection operation.

Figure 9:
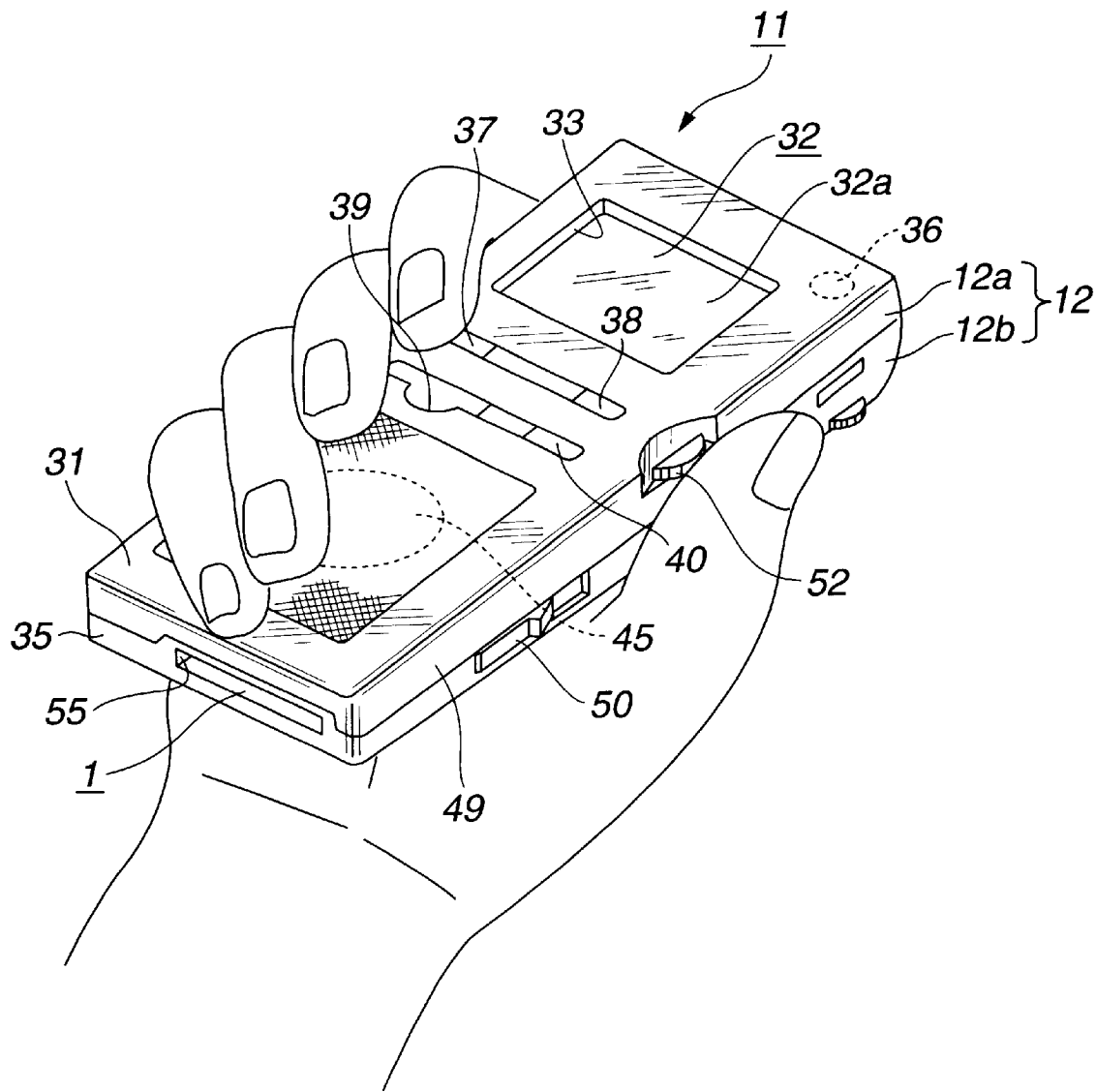
FIG. 9 is a perspective view showing the state of gripping and using the recording and/or reproducing apparatus according to the present invention.

The selection actuation portion 52 for selecting the operating mode is provided towards one end from the mid portion of the housing 12, and the ejection unit 50 is provided at a location towards the opposite end from the mid portion of the housing 12, so that, if the user grips the recording and/or reproducing apparatus 11 with one hand as shown in FIG. 9, and applies the thumb or the index finger to the selection actuation portion 52, the ejection unit 50 is placed at a location that cannot be operated easily by the hand or finger, whereas, if the user puts his or her finger for operating the ejection unit 50, the selection actuation portion 52 is placed at a position that cannot be readily operated by the hand or finger, thus reliably evading a mistaken operation by the user on the ejection unit 50 during recording or reproduction of ejecting the plate-shaped memory 1 loaded on the recording and/or reproducing apparatus 11.

Figure 11:
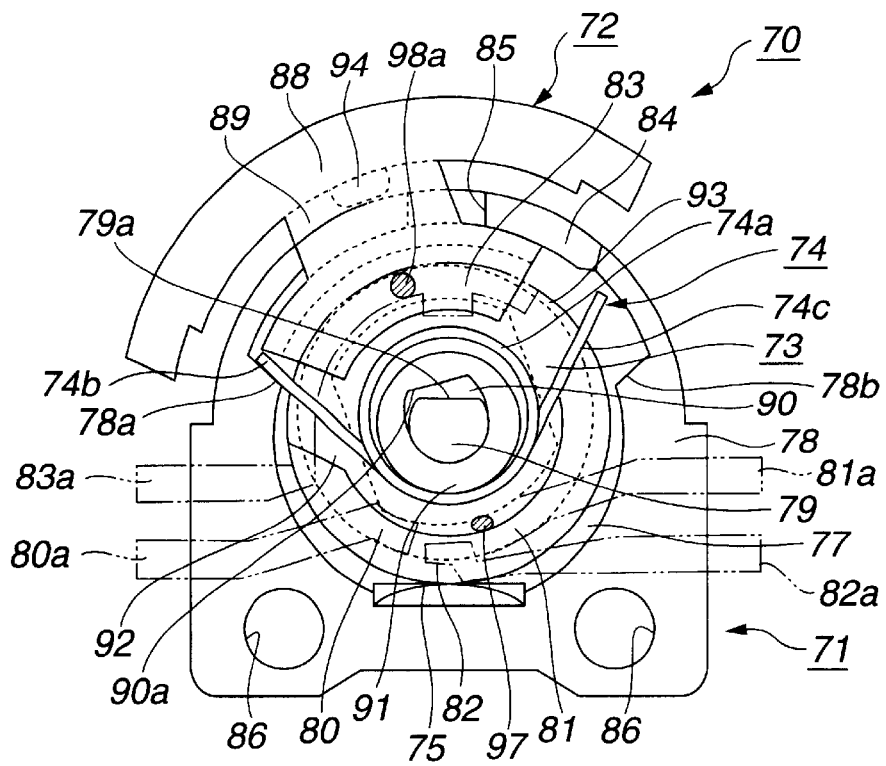
FIG. 11 is a plan view showing the state of rotationally actuating the selecting and effectuating device.
Figure 12:
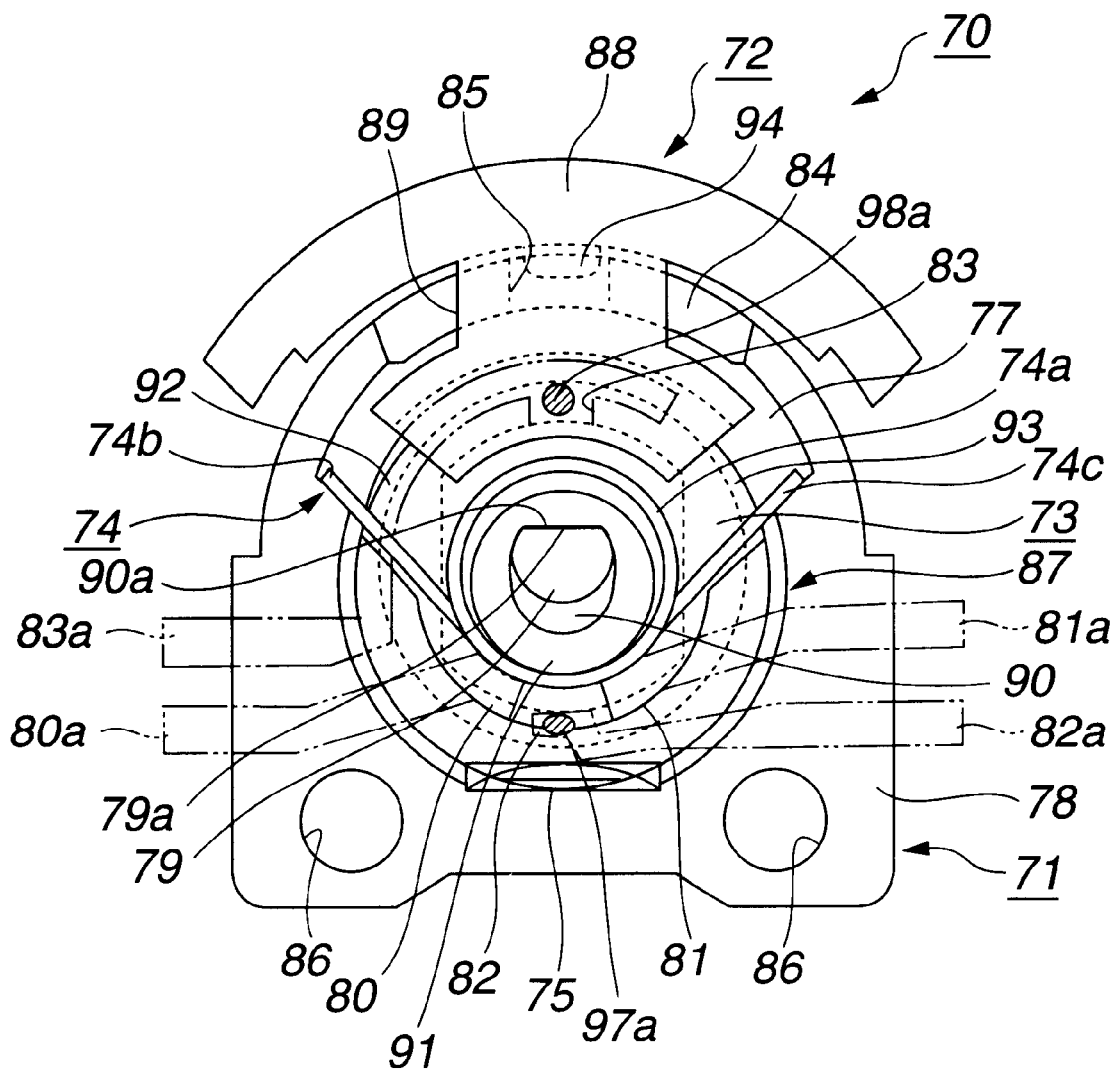
FIG. 12 is a plan view showing the state of thrusting and actuating the rotary pressing type switch.
Figure 13:
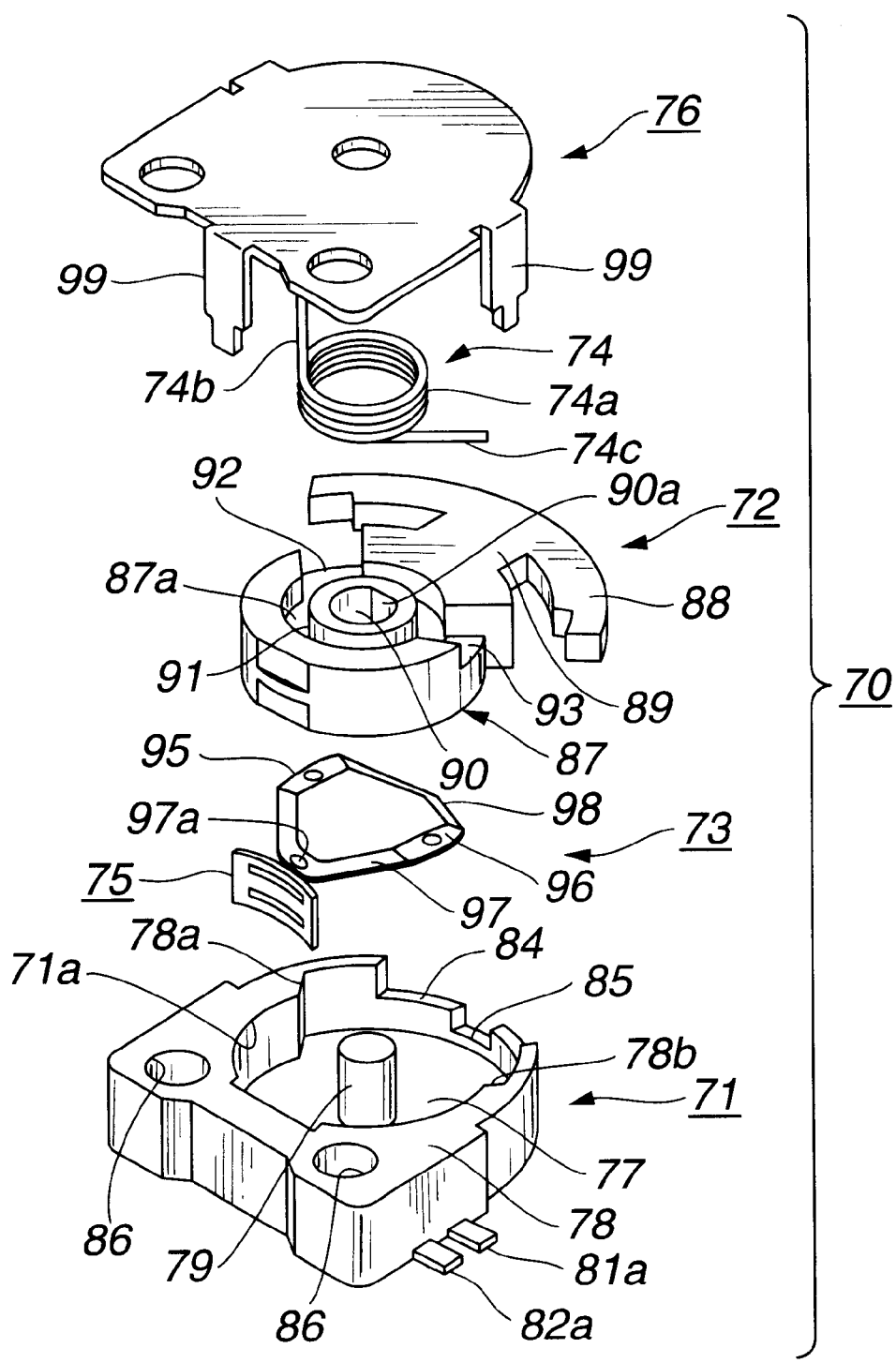
FIG. 13 is an exploded perspective view of the rotary pressing type switch.

The selection actuation portion 52 for selecting the operating modes of the recording and/or reproducing apparatus 11, as described above, is constituted by a rotary thrusting type switch 70 shown in FIGS. 10 to 15. This rotary thrusting type switch 70 is made up of a wafer 71 of synthetic resin, having an upper opening 71a, an operating member 72 rotatably held by the wafer 71, a slider 73, formed by an electrically conductive elastic plate secured to the lower surface of the operating member 72, a torsion coil spring 74 having arms 74b, 74c protruded from both ends of a center coil portion 74a, a click plate 75 mounted in the wafer 71 and a lid member 76 that covers the upper opening 71a of the wafer 71, as shown in FIG. 13.

Figure 15:
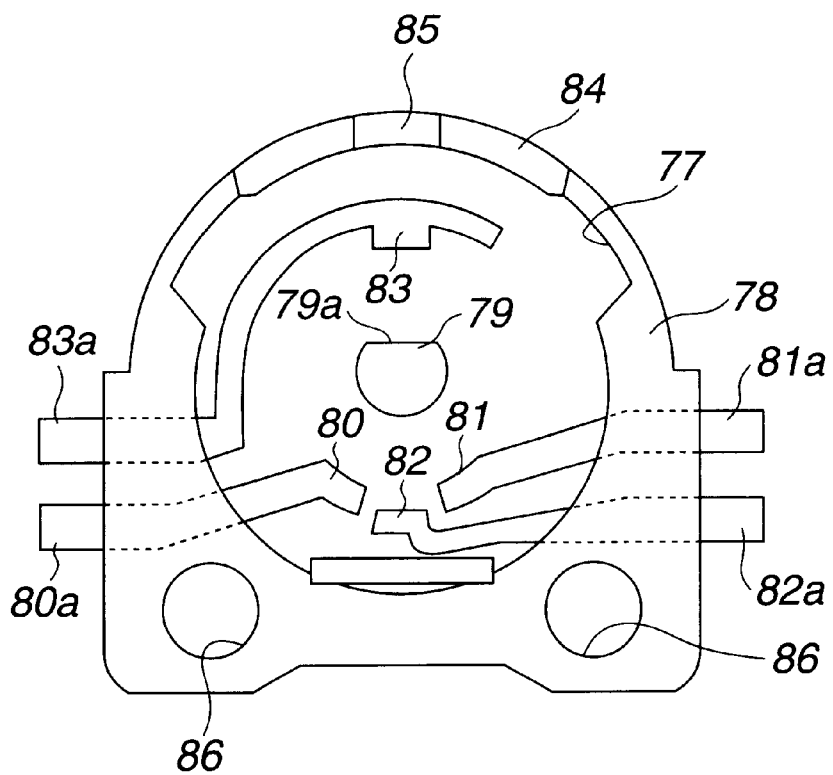
FIG. 15 is a plan view showing a wafer provided in the rotary pressing type switch.

The wafer 71 is made up of a substantially circular bottom surface 77 and a peripheral wall section 78 mounted upright on the entire rim of the bottom surface 77, as shown in FIG. 15. On the peripheral wall section 78 are formed a pair of engagement steps 78a, 78b for retaining a pair of arms 74b, 74c of the torsion coil spring 74. At a mid portion of the bottom surface 77 is mounted upright a pivot 79 for carrying the operating member 72. The pivot 79 is formed with a planar portion 79a subjected to a thrusting force applied to the operating member 72. The bottom surface 77 is provided with first and second stationary contacts 80, 81 for rotation detection, extending along the direction of rotation of the operating member 72, a third stationary contact 82 for detecting the thrusting of the operating member 72 and a common contact 83 provided on the opposite side of the third stationary contact 82 with the pivot 79 in-between and which is connected to the GND. These first to third stationary contacts 80, 81 and 82 are electrically connected to external output terminals 80a to 82a protruded from the peripheral wall section 78. The common contact 83 is also electrically connected to an external contact 83a protruded from the peripheral wall section 78.

The peripheral wall section 78 is formed substantially arcuately, about the pivot 79 as center. The arcuate portion is formed with a control step 84 adapted for controlling the range of rotation of the operating member 72. This control step 84, controlling the range of rotation of the operating member 72, has, at its mid portion, a guide recess 85 for guiding the operating member 72 which is moved when the operating member 72 is thrust. The peripheral wall section 78 is also formed with a mounting hole 86 for mounting to the housing 12 of the recording and/or reproducing apparatus 11.

The operating member 72, provided to the wafer 71, as described above, is formed with symmetry in the left and right direction, and is provided with a base member 87 arranged in the wafer 71, an operating portion 88, protruded from the wafer 71, and a connecting portion 89 interconnecting the base member 87 and the operating portion 88. At a mid portion of the base member 87 is mounted upright a cylindrical boss 91 having an insertion opening 90 into which is inserted the pivot 79. The insertion opening 90 has the thrusting direction of the operating member 72 as its longitudinal direction. Into this insertion opening 90 is inserted the pivot 79. Around the insertion opening 90 is formed an annular groove 87a in which to mount the torsion coil spring 74. In this annular groove 87a are formed a pair of engagement grooves 92, 93 extending in an obliquely upper direction 38.

Figure 10:
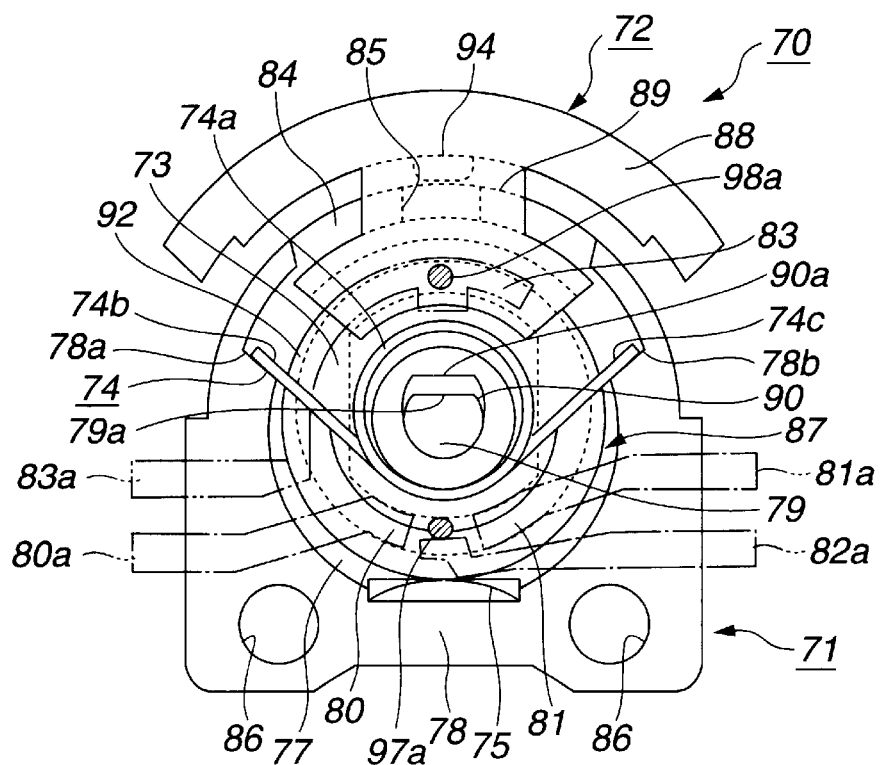
FIG. 10 is a plan view showing the basic state of a rotary pressing type switch of a selecting and effectuating device.

The coil portion 74a of the torsion coil spring 74 is fitted into a boss 91 and positioned in the annular groove 87a, with both arms 74b, 74c engaging in the engagement grooves 92, 93 so as to be retained by the engagement steps 78a, 78b of the wafer 71, as shown in FIG. 10. The portion of the insertion opening 90 in register with the planar surface 79a of the pivot 79 is formed as a planar surface 90a perpendicular to the longitudinal direction of the insertion opening 90. The planar surface 90a is spaced apart from the planar surface 79a in a non-operative state, as shown in FIG. 10. On rotation, the planar surface 90a is offset with respect to the planar surface 79a, as shown in FIG. 11. On thrusting, the planar surface 79a compresses against the planar surface 79a, as shown in FIG. 12.

The operating portion 88 is arcuate in profile, with a base member 97 as center. On the inner side of the operating portion 88 is formed a guide projection 94 engaged in a guide recess 85. During rotation of the operating member 72 shown in FIG. 10, the guide projection 94 is not engaged with the guide recess 85 and is moved along the outer side of the control step 84 of the wafer 71. During rotation of the operating member 72 shown in FIG. 10, this guide projection 94 is not engaged with the guide recess 85 and is moved on the outer side of the control step 84 of the wafer 71. When the operating member 72 is thrust at a center position, shown in FIG. 11, the guide projection 94 is moved as it is guided by the guide recess 85 in the wafer 71.

The slider 73, mounted on the operating member 72, is formed by an electrically conductive metal plate, and includes a pair of mounting portions 95, 96, mounted on the lower surface of the base member 87, and a pair of slide contact portions 97, 98, formed between these mounting portions 95, 96. The slide contact portions 97, 98 are formed integrally with protuberant first and second movable contacts 97a, 98a, respectively, with the second movable contact 98a being in perpetual contact with and electrically connected to the common contact 83. By the operating member 72 being thrust or rotated, the first movable contact 97a is selectively contacted with and electrically connected to the first to third fixed contacts 80 to 82.

Figure 14:
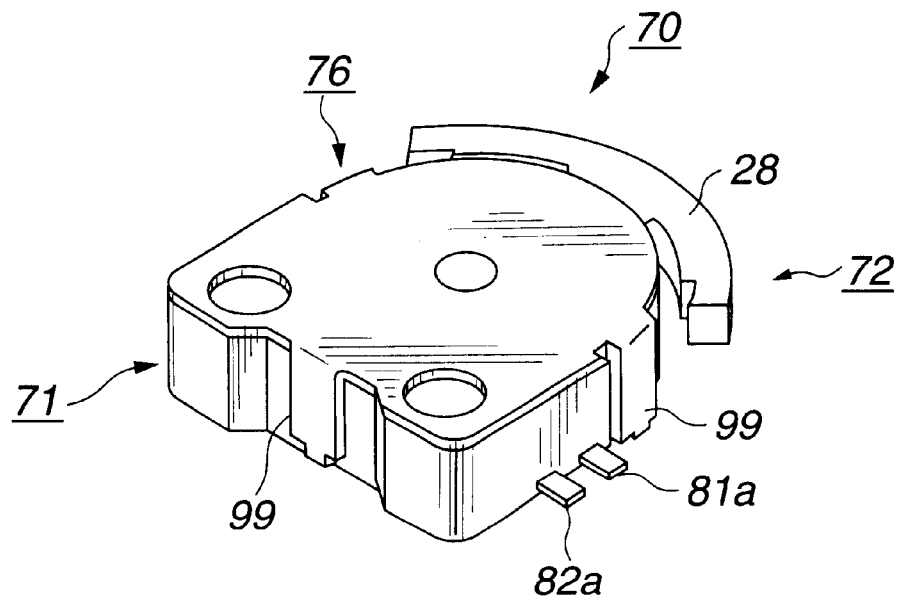
FIG. 14 is a perspective view showing an assembled state thereof.

On the wafer 71, carrying the operating member 72 as discussed above, a lid member 76 is mounted for closing the opening 71a. The lid member 76 is formed integrally with plural retainers 99 for mounting the lid member 76 on the wafer 71. The lid member 76 closes the upper opening 71a of the wafer 71, by intruding these retainers 99 along the peripheral wall section 78 of the wafer 71 for retention by the lower surface of the wafer 71, as shown in FIG. 14.

The method for operating the above-described rotary thrusting type switch 70 is hereinafter explained. This rotary thrusting type switch 70 may be switched to three modes, that is a mode for thrusting the operating member 72, a mode for rotation thereof in one direction and a mode for rotation thereof in the opposite direction. Referring to FIG. 10, the operating member 72 is biased during non-use time by the torsion coil spring 74 towards the center position, since then the arms 74b, 74c of the torsion coil spring 74 are retained by the engagement steps 78a, 78b of the wafer 71 and the coil part 74a thereof is wound about boss 91 of the operating member 72. The guide projection 94 of the operating member 72 then is not engaged with the guide recess 85 of the wafer 71, whilst the planar surface 90a of the through-hole 90 of the operating member 72 is spaced apart from the planar surface 79a of the pivot 79. The second movable contact 98a of the slider 73 is perpetually in contact with the common contact 83, whilst the first movable contact 97a contacts none of the first to third fixed contacts 80 to 82. So, the rotary thrusting type switch 70 is in an off state issuing no electrical signals.

If, with this state of issuing no electrical signals as a basic state, the operating member 72 is rotated counterclockwise from this basic state, the slider 73 is rotated in unison therewith, about the pivot 79 as center, as shown in FIG. 11, until the first movable contact 97a of the slider 73 contacts the second fixed contact 81 serving for rotation detection. This causes the rotary thrusting type switch 70 to issue a first electrical signal at its second external terminal 81a.

The torsion coil spring 74 has its one arm 74b retained by the engagement step 78a of the wafer 71, while having its other arm 74c thrust in the rotating direction by the end of the engagement groove 93 of the operating member 72 in a direction away from the engagement step 78b. That is, the torsion coil spring 74 is compressed in a direction of closing the arms 74b, 74c to impart the force of restoration to the center position to the operating member 72. If the user releases the operating portion 88, the operating member 72 is rotated clockwise, under the force of the torsion coil spring 74, to revert automatically to the center position shown in FIG. 10. The rotary thrusting type switch 70 reverts to the off-state shown in FIG. 10, with the first movable contact 97a being electrically disconnected by being separated away from the second fixed contact 81 for rotation detection. During rotation of the operating member 72, the guide projection 94 is separated from the guide recess 85 so as to be moved on the outer side of the control step 84. Even if a thrusting force is applied to the rotating operating member 72, in the rotary thrusting type switch 70, the guide projection 94 compresses against the control step 84 to control the thrusting on the operating member 72 to prevent erroneous operations.

In similar manner, if the operating member 72 is rotated clockwise, the second movable contact 98a of the slider 73 contacts the common contact 83 at all times, while the first movable contact 97a contacts the first fixed contact 80 for rotation detection into electrical connection with a common contact 83a. This turns the rotary thrusting type switch 70 on to output a second electrical signal at a first external terminal 80a.

If, when the operating member 72 shown in FIG. 10 is thrust for actuation, the operating unit 18 is thrust towards the wafer 1, the operating member 72 and the slider 73 are moved in the thrusting direction of the through-hole 90. The click plate 75 is compressed and deformed by the pressure applied from the base member 87, thus producing the "click" feeling. Simultaneously, the first movable contact 97a of the slider 73 contacts a third fixed contact 82. This turns the rotary thrusting type switch 70 on to issue a third electrical signal via a third external terminal 82a.

The torsion coil spring 74 then has its arms 74b, 74c retained by the engagement steps 78a, 78b of the wafer 71, however, since the coil part 74a is moved in the thrusting direction by the boss 91 of the operating member 72, these arms 74b, 74c are compressed in the closing direction to bias the operating member 72 towards the center position. When the user releases the operating portion 88, the operating member 72 is elevated under the force of the torsion coil spring 74 and reverts automatically to the center position shown in FIG. 10. This separates the first movable contact 97a from the fixed contact 82 for rotation detection to turn off the rotary thrusting type switch 70 again. In the rotary thrusting type switch 70, the guide projection 94 is moved as it is guided by the guide recess 85 during rotation of the operating member 72, so that, if a force in the rotating direction is erroneously applied during the thrusting of the operating member 72, the guide projection 94 compresses against the wall surface of the guide recess 85 to inhibit rotation of the operating member 72 to prevent mistaken operations from occurring.

The selection actuation portion 52 for selecting the operating mode of the recording and/or reproducing apparatus 11 is constituted by the above-described rotary thrusting type switch 70. The operating mode of the recording and/or reproducing apparatus 11 is selected and determined by the operating member 72 being rotated in the direction indicated by arrow X1 or X2 in FIG. 7 and by the operating member 72 being thrust in the direction indicated by arrow Y1 in FIG. 7.

The manner of using the selection actuation portion 52 formed by the rotary thrusting type switch 70 is specifically explained. If audio data is recorded on the plate-shaped memory 1, loaded on the recording and/or reproducing apparatus 11, the user thrusts the recording start button 48 shown in FIG. 3 to record the audio data collected by the microphone 36 on the loaded plate-shaped memory 1. If the recording start button 48 is again thrust, the recording operation is halted. In reproducing the audio data, recorded on the plate-shaped memory 1, the user rotates the selection actuation portion 52 in the direction indicated by arrow X1 or in the direction opposite to that indicated by arrow X1 in FIG. 3 to select a task number of a folder having recorded therein the desired audio data. The user then thrusts the selection actuation portion 52 in the direction indicated by arrow Y1 in FIG. 3 to reproduce the audio data of the selected folder. If the selection actuation portion 52 is rotated in the direction indicated by arrow X1 in FIG. 3 during reproduction of the audio data, the audio data being reproduced is located, whereas, if the selection actuation portion 52 is rotated in the direction indicated by arrow X2 in FIG. 3, audio data next to the audio data being reproduced is reproduced. If the selection actuation portion 52 is rotated intermittently in the direction indicated by arrow X1 in FIG. 3, reversion is made in an amount corresponding to the rotated angle to the previous task, whereas, if the selection actuation portion 52 is rotated intermittently in the direction indicated by arrow X2 in FIG. 3, it is possible to proceed to a subsequent task in an amount corresponding to the rotated angle.

When the menu selection button 37 shown in FIG. 3 is thrust, a list of the operating menu is displayed on the display surface 32a of the display member 32. Specifically if the menu selection button 37 is thrust, a list of various functions, namely the language selection function of switching the displayed fonts between the English and the Japanese, the function of formatting the plate-shaped memory 1 as a recording medium, the beep switching function of generating beep sound, and the recording time switching function of switching the recordable time on the plate-shaped memory 1 between the long time mode, such as 120 minutes, and the short time mode, such as 60 minutes. The user rotates the selection actuation portion 52 in the direction indicated by arrow X1 or in the direction indicated by arrow X2 in FIG. 3 to select one of the items of the operating menu demonstrated on the display surface 32a. The user then thrusts the selection actuation portion 52 in the direction indicated by arrow X1 or in the direction indicated by arrow X2 in FIG. 3 to select one of the selected functions of the recording and/or reproducing apparatus 11. The user then rotates the selection actuation portion 52 in the direction indicated by arrow X1 or in the direction indicated by arrow X2 in FIG. 3 to select the on/off of the selected operation, and then thrusts the selection actuation portion 52 in the direction indicated by arrow Y1 in FIG. 3 to set the so-selected on/off.

The user thrusts the menu selection button 37 to rotate the selection actuation portion 52 in the direction indicated by arrow X1 or X2 in FIG. 3, from the operating menu demonstrated on the display surface 32a, to select the recording time switching function. The user also thrusts the menu selection button 37 in the direction indicated by arrow Y1 in FIG. 3 to display the long-time mode and the short-time mode on the display surface 32a. The user then rotates the selection actuation portion 52 in the direction indicated by arrow X1 or X2 in FIG. 3 to select the long-time mode or the short-time mode and thrusts the menu selection button 37 in the direction indicated by arrow Y1 in FIG. 3 to set the selected recording time.

Since the selection actuation portion 52, constituted by the rotary thrusting type switch 70, can be operated in three directions, a large number of functions can be switched with a small number of operating buttons. In particular, in the case of a electronic equipment, e.g., a recording and/or reproducing apparatus 11, reduced to the size of the palm of the hand, in which there is only little space for providing operating buttons, the selection actuation portion 52 can efficiently be formed by the rotary thrusting type switch 70.

Meanwhile, a loading mechanism provided in the housing 12 of the plate-shaped memory 1 used in the recording and/or reproducing apparatus 11 is constructed as follows: The loading device 120 includes a chassis 14, mounted on the housing 12, and a holder 13 slidably mounted on the chassis 14 and which holds the plate-shaped memory 1, as shown in FIGS. 16 and 17.

The chassis 14 is formed by punching and bowing a metal sheet to a substantially U-shaped cross-section, and includes a substantially rectangular bottom plate 15 and first and second sidewall sections 16, 17 formed upright substantially parallel to each other on both sides in the longitudinal direction of the bottom plate 15. The holder 13 is mounted within an area defined by the bottom plate 15 and the first and second sidewall sections 16, 17 for movement in the same direction as the inserting direction of the plate-shaped memory 1, that is in the direction indicated by arrow B and in the reverse direction thereto as shown in FIGS. 16 and 17.

The bottom plate 15, on which is mounted the holder 13, is substantially rectangular in profile, with the length of the long side of the rectangle being approximately equal to the longitudinal length of the plate-shaped memory 1. Towards the rear side of the bottom plate 15, there are formed guide holes 129, 129 for guiding the movement of the holder 13. In these guide holes 129, 129 are engaged guide projections formed on the bottom surface of the holder 13 to control the area in which the holder 13 is moved. In the first and second sidewall sections 16, 17 are formed guide holes 130, 130 for extending along the movement direction of the holder 13. The guide holes 130, 130 guide the movement of the holder 13 to control the area in which the holder is moved.

Figure 16:
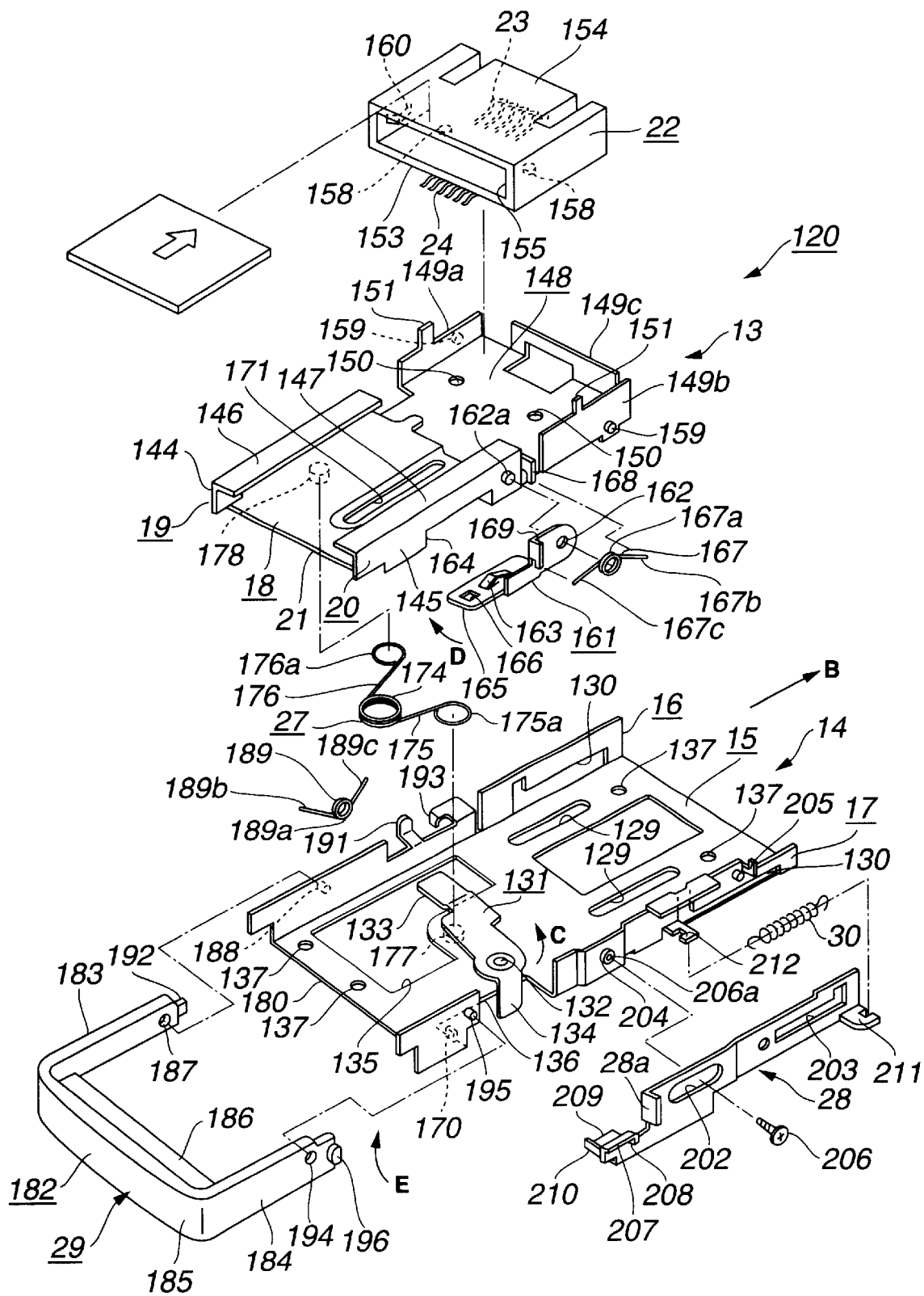
FIG. 16 is an exploded perspective view of the loading device for a plate-shaped memory enclosed within the recording and/or reproducing apparatus according to the present invention.
Figure 17:
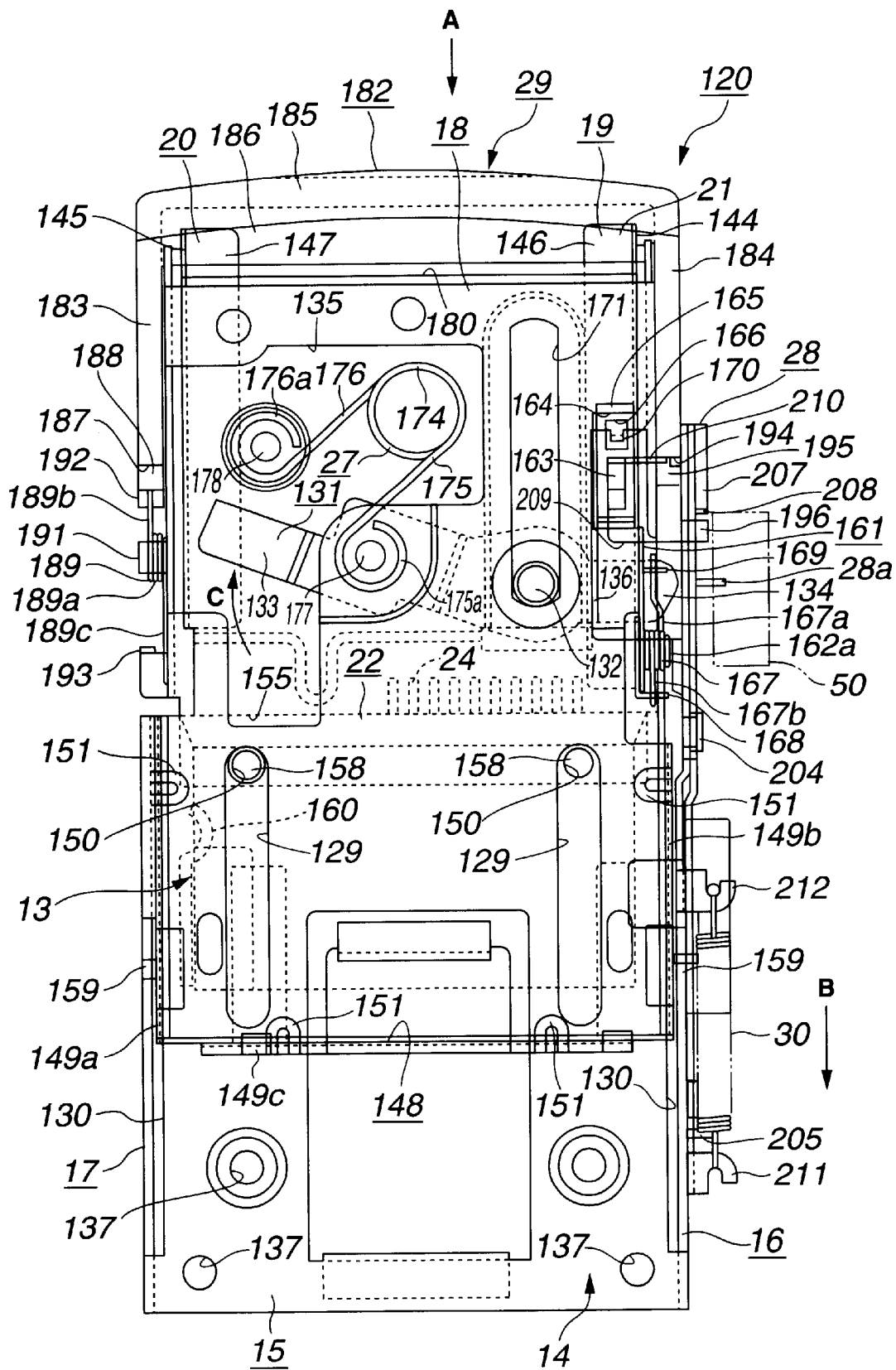
FIG. 17 is a plan view thereof.

On the front side of the bottom plate 15, operating as a side for insertion of the plate-shaped memory 1, there is mounted a rotary arm 131 for sliding the holder 13, slid in the direction indicated by arrow B in FIGS. 16 and 17, in the direction reverse to the direction indicated by arrow B in FIGS. 16 and 17. The rotary arm 131 has its mid portion carried by a pivot 132 provided on the bottom plate 15, and is supported for rotation in the direction indicated by arrow C or in the reverse direction thereto in FIGS. 16 and 17 about the pivot 132 as the center of rotation. This rotary arm 131 has a length approximately equal to the distance between the first and second sidewall sections 16, 17 and includes a thrusting portion 133 at one end of the first sidewall section 16 for thrusting the holder 13 in the direction opposite to the direction indicated by arrow B in FIGS. 16, 17. The rotary arm 131 also includes a thrust portion 134 at the other end towards the second sidewall section 17 which is thrust by a thrusting portion of the ejection member 28. The thrusting portion 133 at one end of the rotary arm 131 faces to outside via opening 135 in the bottom plate 15. The thrust portion 134, provided at the other end, faces to outside via opening 136 formed across the bottom plate 15 and the second sidewall section 17 of the chassis 14 to provide for connection to the ejection member 28.

The rotary arm 131 is rotated in the direction indicated by arrow C in FIGS. 16, 17, about the pivot 132 as center of rotation, by the thrust portion 134 being thrust in the direction indicated by arrow C in FIGS. 16, 17 by the operating portion 28a of the ejection member 28, to shift the thrusting portion 133 on the opposite side towards the front side of the chassis 14. This thrusts the holder 13 located on the back side of the chassis 14 against the thrusting portion 133 moved on the front side of the chassis 14 to slide the holder 13 towards the front side of the chassis 14, that is a direction opposite to the direction of arrow mark B in FIGS. 16 and 17.

Meanwhile, plural mounting holes 137 for mounting on the housing 12 of the recording and/or reproducing apparatus 11 are formed in the bottom plate 15.

The holder 13, slidably mounted on the chassis 14 as described above, is formed by bowing a metal sheet to a size slightly larger than the chassis 14, as shown in FIGS. 16 and 17. This holder 13 is formed integrally with the first and second memory holding portions 19, 20 on both sides on the front side of the memory support plate 18 for holding the plate-shaped memory 1. These first and second memory holding portions 19, 20 are formed by vertically bowing both sides of the memory support plate 18, and are made up of substantially parallel sidewall sections 144, 145 of a height corresponding to the thickness of the plate-shaped memory 1 and supporting pieces 146, 147 formed by bowing the distal ends of the sidewall sections 144, 145 in a direction parallel to the memory support plate 18. In the front side of the holder 13 is formed the insertion/ejection opening 21 defined by the first and second memory holding portions 19, 20 and the memory support plate 18 for inserting and ejecting the plate-shaped memory 1. The space between the first and second memory holding portions 19, 20 is opened, so that, when the plate-shaped memory 1 is held by the first and second memory holding portions 19, 20, the user is able to view the label 10 attached to the label affixing area 9 through the second window 56 in the housing 12 when the plate-shaped memory 1 is held by the first and second memory holding portions 19, 20.

On the rear side of the holder 13 is formed a connector mounting portion 148 on which to mount a connector connected to an electrode 3b provided at an inserting end of the plate-shaped memory 1. This connector mounting portion 148 is made up of control wall sections 149a, 149b, 149c provided on lateral sides of the memory support plate 18 excluding its front side for controlling the connector mounting positions, and the memory support plate 18. The distal ends of the control wall sections 149a, 149b, 149c are formed with connector retainers 151 for retaining the connector. The memory support plate 18, making up the connector mounting portion 148, is provided with positioning holes 150, 150 for mounting the connector in position.

The connector 22, mounted on the connector mounting portion 148, is made up of a terminal plate 153 for connection to the electrode 3b of the plate-shaped memory 1 and a cover 154 of a substantially U-shaped cross-section, mounted on this terminal plate 153, as shown in FIG. 16. With the cover 154 fitted to the terminal plate 153, there is defined a housing section within the interior of the connector 22 in which to accommodate the front side of the plate-shaped memory 1. On the front side of the connector 22 is defined an insertion opening 155 in which to insert the front side of the plate-shaped memory 1 carrying the terminal unit 3 on its front side.

On one sidewall section of the cover 154, there is provided an elastic engagement piece 160 forming a detachment preventative piece engaged in the detachment preventative recess 7 provided in the plate-shaped memory 1. The elastic engagement piece 160 is engaged in the detachment preventative recess 7 of the plate-shaped memory 1 to hold the plate-shaped memory 1 in the holder 13 to prevent detachment of the plate-shaped memory 1 mounted in the loading device 120. When engaged in the detachment preventative recess 7 of the plate-shaped memory 1, the elastic engagement piece 160 is elastically displaced to give the user a "click" feeling to make the user recognize that the plate-shaped memory 1 has been fully inserted into the holder 13. The elastic engagement piece 160 also acts as a mistaken insertion preventative piece operating for inhibiting insertion into the holder 13 of the plate-shaped memory 1 when the plate-shaped memory 1 has not been inserted as normally. The connector 22 may also be provided in the rear wall section of the cover 154 with a detachment preventative member engaged in the arcuate cut-out 4 and in the mistaken insertion preventative groove 5 formed in the rear surface of the plate-shaped memory 1.

The terminal plate 153, constituting the bottom plate of the connector 22, is provided with the first connection terminals 23, electrically connected to the terminal unit 3 of the plate-shaped memory 1, and with the second connection terminal 24 connected to a flexible printed wiring board having an electrical circuit, such as a signal processing circuit, assembled therein. The number of the first connection terminals 23 corresponds to the number of the electrodes 3b making up the terminal unit 3 of the plate-shaped memory 1. These first connection terminals 23 are bowed to substantially L shape, with the upper sides thereof protruding upwards and compressing against the electrodes 3b of the plate-shaped memory 1 so as to be flexed thereby elastically. When the plate-shaped memory 1 has been intruded in position, the first connection terminals 23 are intruded via the open end of the terminal unit 3 of the plate-shaped memory 1 into pressure contact with the electrode 3b to provide for electrical connection to the electrode 3b.

To the second connection terminal 24 is connected a flexible printed wiring board for electrical connection to the printed wiring board having an electrical circuitry, such as a signal processing circuit, assembled therein. That is, the plate-shaped memory 1, to the first connection terminals 23 of which the terminal unit 3 is electrically connected, is controlled through the printed wiring board, adapted for electrically connecting the first connection terminals 24 to the printed wiring board provided in the housing 12, by a signal processing circuit provided on the printed wiring board. The second connection terminal 24 is provided in the vicinity of the insertion opening 155 for facilitating electrical connection to the flexible printed wiring board. This printed wiring board is of a length sufficient to permit the holder 13 to be moved between the insertion/ejection position on the front side of the chassis 14 and the loading position on the back side thereof. On the back surface of the terminal plate 153 constituting the connector 22 provided with the first connection terminals 23 and with the second connection terminal 24, there are formed positioning projections 158, 158 for connecting the connector in position on the connector mounting portion 148 provided on the memory support plate 18 of the holder 13.

On a ceiling plate of the cover 154 of the connector 22, there is mounted the aforementioned cover plate 25 such as with an adhesive. The cover plate 25 is mounted on the top plate of the cover 154 to overlie the second connection terminal 24 provided to the terminal plate 153. When the loading device 120 is mounted on the housing 12, the cover plate 25 is exposed to outside via the second window 56 of the housing 12. That is, the cover plate 25 is sized so as to be just large enough to hide the second connection terminal 24 and not to hide the label 10 attached to the label affixing area 9 when the plate-shaped memory 1 is inserted into the first and second memory holding portions 19, 20. On the surface of the cover plate 25, there is provided a display mark 26, such as by printing or scoring, for indicating the direction of insertion of the plate-shaped memory 1 into the holder 13 or the presence or absence of the plate-shaped memory 1 loaded therein.

The connector 22, carrying the cover 154 by its terminal plate 153, is mounted on the connector mounting portion 148, by the positioning projections 158, 158 of the terminal plate 153 engaging in the positioning holes 150, 150 formed in the connector mounting portion 148 of the memory support plate 18 and by the connector retainers 151 formed on the distal ends of the control wall sections 149a, 149b, 149c of the connector mounting portion 148 being bowed and engaging with the connector 22. The positioning projections 158, 158 formed on the terminal plate 153 also act as guide projections, when the holder 13 is moved relative to the chassis 14, by the positioning projections 158, 158 passing through the positioning holes 150, 150 in the memory support plate 18 so as to be protruded beyond the memory support plate 18, with the protruded portions then engaging in the guide holes 129, 129 formed in the chassis 14.

The control wall sections 149a, 149b, making up the connector mounting portion 148, extending parallel to the sidewall sections 144, 145 of the holder 13, are formed integrally with guide projections 159, 159 engaged in guide holes 130, 130 formed in the first and second sidewall sections 16, 17 of the chassis 14, as shown in FIG. 16. In the memory support plate 18 of the holder 13 is formed a guide hole 171 for extending along the direction of movement of the holder 13. In this guide hole 171 is engaged the pivot 132 of the rotary arm 131 mounted on the bottom plate 15 of the chassis 14. That is, the pivot 132 also acts as a guide projection when the holder 13 is moved relative to the chassis 14.

On a sidewall section 145, making up a second memory holding portion 20 of the holder 13, there is rotatably mounted a control member 161 for regulating the movement of the holder 13 with respect to the chassis 14. The control member 161 is provided at its proximal end with a pivot hole 162, into which is inserted a pivot 162a provided on the sidewall section 145 of the holder 13, so that the control member 161 is supported for rotation in the direction indicated by arrow D and in the direction opposite thereto, as shown in FIG. 18

The control member 161 is provided with an engagement projection 163 engaged in the engagement recess 8 of the plate-shaped memory 1 when the plate-shaped memory 1 is inserted into the holder 13. The engagement projection 163 is intruded into the inside of the holder 13 via opening 164 formed across the memory support plate 18 and the sidewall section 145 of the holder 13 into engagement with the engagement recess 8 of the plate-shaped memory 1 accommodated in the holder 13. On the distal end of the control member 161 beyond the engagement projection 163 is formed a retainer 165 held on the back surface on the rim of the opening 164 in the memory support plate 18 and in the sidewall section 145 to control the range of rotation of the control member 161 in the direction indicated by arrow D in FIG. 18. In the vicinity of the retainer 165 is formed a control hole 166 engaged by an engagement projection 170 provided in the vicinity of the opening 136 in the bottom plate 15 of the chassis 14. By the control hole 166 engaging the engagement projection 170 formed on the chassis 14, the holder 13 is prohibited from sliding from the insertion/ejection position on the front side of the chassis 14 to the loading position on the back surface side of the chassis 14. That is, when the plate-shaped memory 1 is inserted into the holder 13 in the insertion/ejection position, the holder 13 is locked in this insertion/ejection position by the control member 161, and hence the terminal unit 3 of the plate-shaped memory 1 may be reliably connected to the first line amplifier 23.

Figure 18:
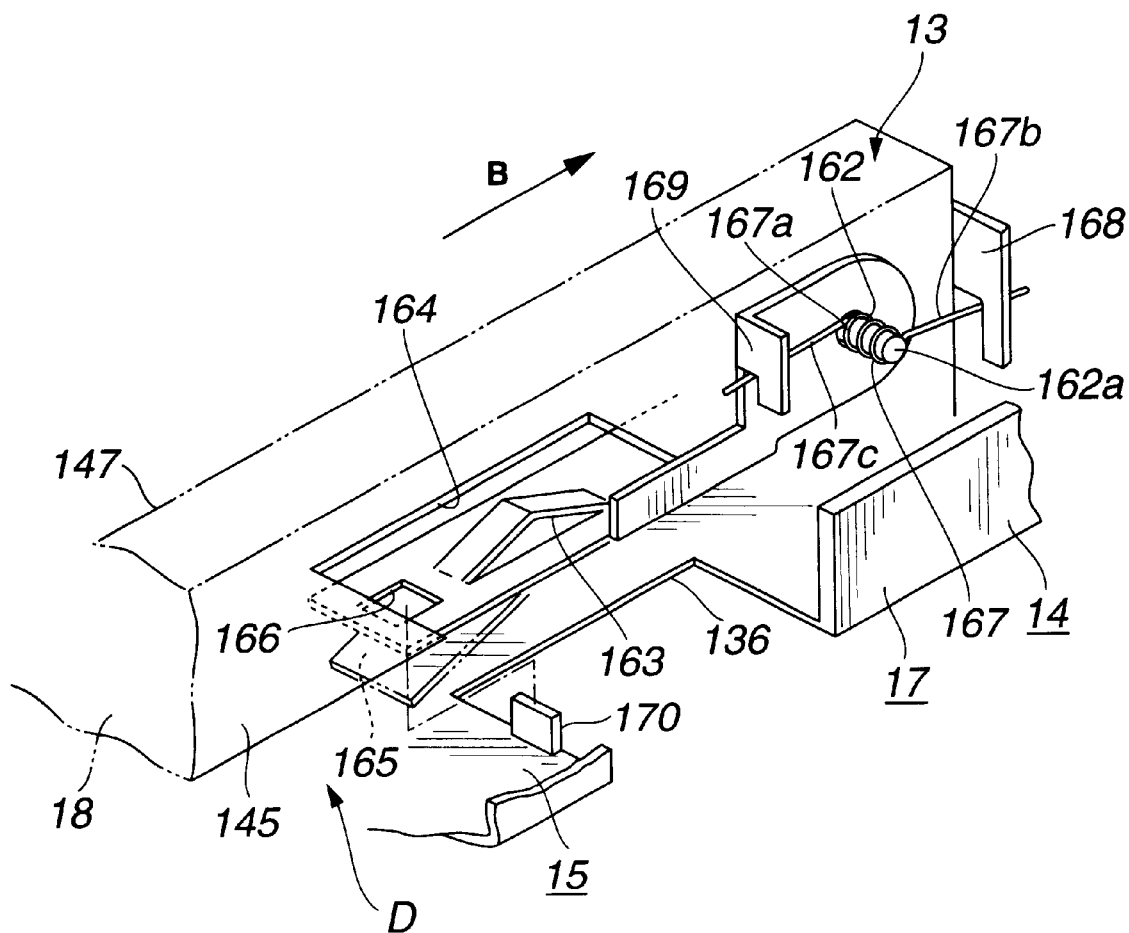
FIG. 18 is a schematic perspective view showing the mounting state of a regulating member mounted on a holder of the loading device.

The above-described control member 161 is biased by a torsion spring, as a biasing member, in the direction indicated by arrow D in FIG. 18, that is towards the inner side of the holder 13. The torsion spring 167 has its proximal end 167a fitted on the pivot 162a mounted upright on the sidewall section 145 of the holder 13 from above the control member 161. The torsion spring 167 has its one arm 167b engaged by a retainer 168 formed on the sidewall section 145 of the holder 13, while having its other arm 167c engaged by a retainer 169 formed on the sidewall section 145 of the holder 13. The torsion spring 167, described above, biases the control member 161 in the direction indicated by arrow D in FIG. 18. The control member 161 is mounted on the sidewall section 145, by having the distal side retainer 165 engaged on the back surface of the memory support plate 18 in the vicinity of the opening 164, so that the engagement projection 163 faces the inside of the holder 13 via opening 164.

With the holder 13, described above, the guide projections 159, 159 provided on the control wall sections 149a, 149b making up the connector mounting portion 148 are engaged in the guide holes 130, 130 of the chassis 14, whilst the positioning projections 158, 158 of the terminal plate 153 mounted on the connector mounting portion 148 are engaged in the guide holes 129, 129 formed in the chassis 14, as shown in FIGS. 16, 17. The holder 13 is mounted for sliding movement between the first and second sidewall sections 16, 17 of the chassis 14, by the pivot 132 engaging in the guide hole 171 in the memory support plate 18 of the holder 13. The holder 13 is slid between the insertion/ejection position on the front side of the chassis 14 for the plate-shaped memory 1 and the mounting position on the back surface of the chassis 14 for writing/readout of information signals on or from the semiconductor memory in the plate-shaped memory 1. It is noted that the insertion/ejection position is the state shown in FIG. 7, whilst the loading position is the state as described above with reference to FIG. 8. When the holder 13 is in the insertion/ejection position, the plate-shaped memory 1 is inserted or ejected, whereas, when the holder 13 is in the loading position, the information signals are written in or read out from the semiconductor memory in the plate-shaped memory 1.

The chassis 14 and the holder 13 are interconnected by a toggle spring 27, as a biasing member, as shown in FIGS. 16 and 17. This toggle spring 27 is made up of a coil part 174, comprised of tightly packed turns of a linear material, a first arm 175 extending in one direction from the coil part 174, and a second arm 176 extending in the opposite direction from the coil part 174. On the distal end of the first arm 175 is formed a first engaging portion 175a engaged with the chassis 14, whereas, on the distal end of the second arm 176, there is formed a second engaging portion 176a engaged with the holder 13. The first engaging portion 175a is engaged with a first engaging projection 177 provided on the back side of the bottom plate 15 of the chassis 14, whilst the second engaging portion 176a is engaged with a second engaging projection 178 provided on the back side of the memory support plate 18 of the holder 13.

When the holder 14 is in the insertion/ejection position towards the front side of the chassis 14, the toggle spring 27, interconnecting the chassis 14 and the holder 13, is in the first state of biasing in the direction opposite to the direction indicated by arrow B in FIGS. 16, 17. When the holder 13 is slid in the direction indicated by arrow B in FIGS. 16 and 17 with respect to the chassis 14, the toggle spring 27 is inverted in it biasing direction such that it biases the holder 13 in the direction indicated by arrow B in FIGS. 16, 17 to slide the holder 13 towards the loading position on the back side of the chassis 14. If, when the holder 13 is in the loading position, the rotary arm 131 mounted on the bottom plate 15 of the chassis 14 is rotated in the direction indicated by arrow C in FIG. 17, the thrusting portion 133 formed on one end of the rotary arm 131 thrusts the second engaging projection 178 of the holder 13. The toggle spring 27, in the second state, then is inverted to its first state of biasing the holder 13 in the direction opposite to that indicated by arrow B in FIG. 17, by the holder 13 being slid in the direction opposite to that indicated by arrow B in FIG. 17, under the force of thrusting the second engaging projection 178 of the holder 13 from the thrusting portion 133 of the rotary arm 131, to cause movement of the holder 13 in the inserting/ejecting position.

On the chassis 14, on which the holder 13 is mounted for sliding movement, there is rotatably mounted a lid 29 for opening/closing the front surface of the chassis 14 and the insertion/ejection opening 21 for the plate-shaped memory 1 provided on the front surface of the holder 13. The lid 29 is provided with a closure plate 182 for closing the front surface of the chassis 14 and the insertion/ejection opening 21 and first and second rotation supporting arms 183, 184 provided on both lateral sides of the closure plate 182.

The closure plate 182 is made up of a first closure portion 185 for closing the insertion/ejection opening 21 of the holder 13 and the front surface of the chassis 14 and a second closure portion 186 fitting in a cut-out 180 formed in the front surface of the bottom plate 15 of the chassis 14.

Figure 19:
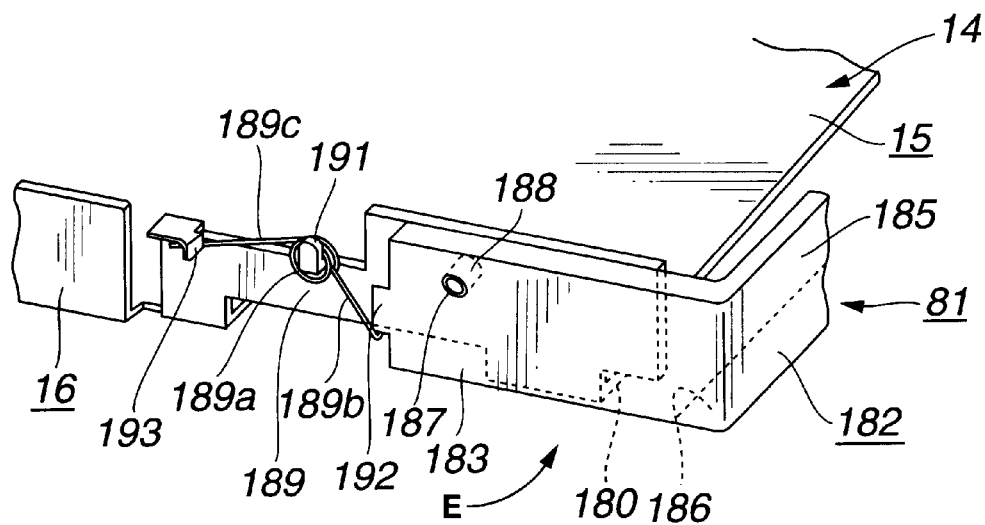
FIG. 19 is a schematic perspective view showing the mounting state of a lid on a chassis.

Referring to FIG. 19, a first rotation supporting arm 183, located towards the first sidewall section 16 of the chassis 14, is provided at the distal end thereof with a first supporting hole 187 for rotationally supporting the lid 29. This first supporting hole 187 is engaged by a first pivot 188 provided on the front surface of the first sidewall section 16 of the chassis 14. The lid 29 is rotationally biased, on the side of the first rotation supporting arm 183, in the direction of closing the insertion/ejection opening 21, as indicated by arrow E in FIG. 20, by a torsion spring 189 operating as a biasing member. This torsion spring 189 has its proximal portion 189a engaged by an engaging piece 191 formed on the first sidewall section 16 of the chassis 14. The torsion spring 189 has its one arm 189b engaged with a retainer 192 formed at the distal end of the first rotation supporting arm 183, while having its other arm 189c engaged with a retainer 193 provided on the first sidewall section 16, for rotationally biasing the lid 29 in the direction indicated by arrow E in FIG. 20.

The second rotation supporting arm 184, located towards the second sidewall section 17 of the chassis 14, is formed at the distal end thereof with a second supporting hole 194 for rotationally supporting the lid 29 along with the first supporting hole 187. This second supporting hole 194 is engaged by a second pivot 195 provided on the front surface side of the second sidewall section 17 of the chassis 14. On the distal end of the second rotation supporting arm 184, there is provided a projection 196 thrust by the ejection member 28 to rotate the lid 29 in the direction opposite to that indicated by arrow E in FIG. 20. The lower side of the projection 196 is formed integrally with an inclined surface section 197 for facilitating contact thereof with a cam provided on the ejection member 28.

Figure 20:
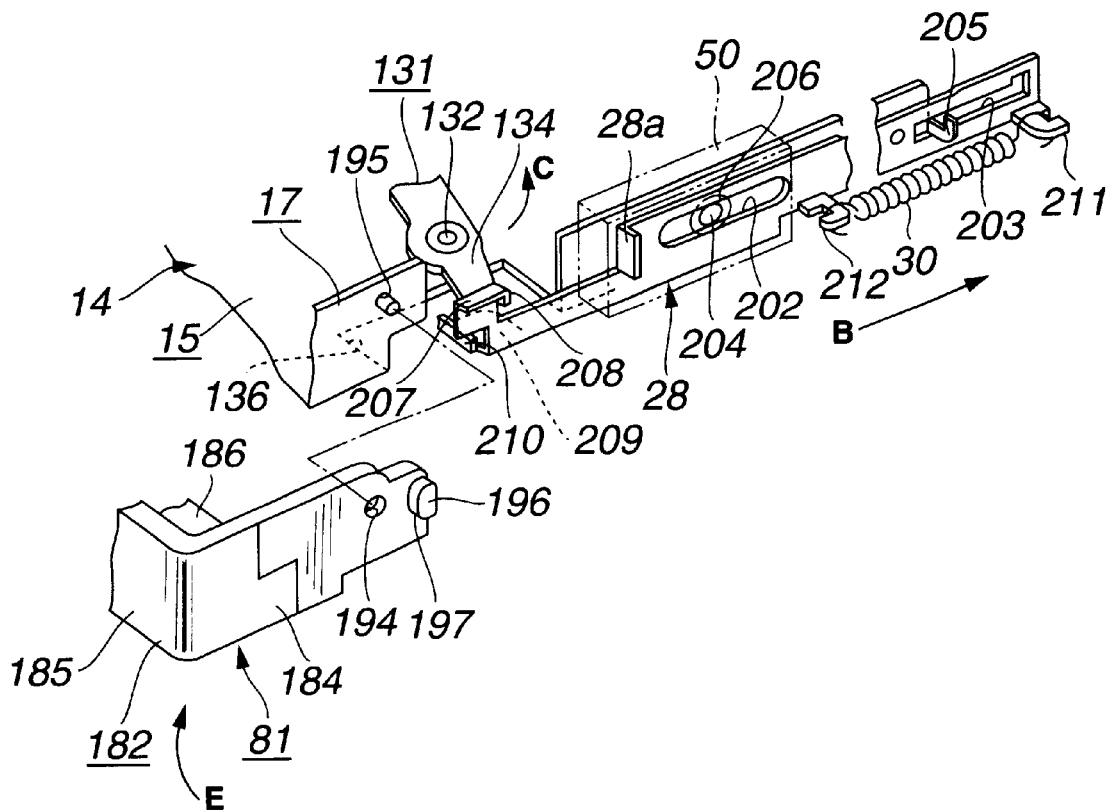
FIG. 20 is a schematic perspective view showing the mounting state of an ejecting member mounted on a chassis.

The lid 29, described above, is supported for rotation in the direction indicated by arrows E and in the direction opposite to that indicated by arrow E in FIGS. 19 and 20, about the first and second pivots 188, 195 as center, by the first and second pivots 188, 195 engaging in the first and second support holes 187, 194, as shown in FIGS. 19 and 20. The lid 29 is rotationally biased by the torsion spring 189 in the direction indicated by arrow E and in the direction opposite to that indicated by arrow E in FIGS. 19 and 20. By the inclined surface section 197 of the projection 196 formed on the second rotation supporting arm 184 being thrust by the cam of the ejection member 28, the lid 29 is rotated in the direction opposite to that indicated by arrow E in FIGS. 19 and 20, about the first and second pivots 188, 195 as center, for opening the front surface of the chassis 14 and the insertion/ejection opening 21 of the holder 13.

On the second sidewall section 17 of the chassis 14, there is provided the ejection member 28 for shifting the holder 13 from the loading position on the back side of the chassis 14 to the insertion/ejection position on the front surface side of the chassis 14 by the toggle spring 27 interconnecting the chassis 14 and the holder 13, as shown in FIGS. 16 and 17. The ejection member 28 is mounted on the second sidewall section 17 for sliding in the longitudinal direction, that is in the direction indicated by arrow B and in the direction opposite to that indicated by arrow B in FIG. 20. The ejection member 28 has a width approximately equal to the height of the second sidewall section 17 of the chassis 14, as shown in FIG. 20, and is formed by punching a metal sheet in substantially an elongated rectangular shape. In the ejection member 28 are formed a first guide opening 202 and a second guide opening 203 for extending along the longitudinal direction. The first guide opening 202 is engaged by a guide projection 204 provided on the second sidewall section 17 of the chassis 14, whilst the second guide opening 203 is engaged by a guide piece 205 provided on the second sidewall section 17. The ejection member 28 is mounted on the second sidewall section 17 by a set screw 206 threaded into a tapped hole 206a formed in the guide projection 204 formed in the second sidewall section 17 in the first guide opening 202.

The ejection member 28 is biased in the direction opposite to that indicated by arrow B in FIG. 20 by a torsion spring 30, as a biasing member, as shown in FIG. 20. The torsion spring 30 has its one end retained by a spring retainer 211 provided on an end of the ejection member 28 corresponding to the back surface of the chassis 14. The torsion spring 30 has its other end retained by another spring retainer 212, formed partway along the length of the second sidewall section 17 of the chassis 14, for biasing the ejection member 28 in the direction opposite to that indicated by arrow B in FIG. 20.

On one end towards the front side of the chassis 14 of the ejection member 28, mounted on the second sidewall section 17 of the chassis 14, as described above, there is provided a cam 207 by bowing the one end in a direction parallel to the bottom plate 15 of the chassis 14, as shown in FIG. 20. The cam 207 is adapted for thrusting the projection 196 formed on the second rotation supporting arm 184 of the lid 29, as described above. The cam 207 is intruded into the inside of the chassis 14 through an opening 136 formed in the bottom plate 15 of the chassis 14. The cam 207 is formed integrally with a downward bend 208 on the back surface of the chassis 14 to provide for facilitated thrusting of the inclined surface portion 197 formed on the lower surface of the projection 196 provided on the second rotation supporting arm 184 of the lid 29.

On one side of the ejection member 28 facing the front surface of the chassis 14, there is provided an operating piece 209 for thrusting the thrust portion 134 formed on the opposite end of the rotary arm 131 towards the back surface of the chassis 14, that is in the direction indicated by arrow C in FIG. 20. The operating piece 209 is formed by bowing the one end in a direction parallel to the bottom plate 15 of the chassis 14. The operating piece 209 is formed integrally with a thrusting portion 210 by bowing the distal end of the ejection member 28. The thrusting portion 210, formed on the operating piece 209, is intruded into the inside of the chassis 14 via opening 136 provided in the bottom plate 15 of the chassis 14 into engagement with the thrust portion 134 of the rotary arm 131.

One end of the ejection member 28 is bowed to form the operating portion 28a that is slid by the ejection unit 50 facing to outside of a casing of the main body portion of the apparatus, not shown. As the operating portion 28a is slid in the direction indicated by arrow B in FIG. 20, the ejection member 28 is slid in the same direction.

As the holder 13 is in the loading position on the back side of the chassis 14, the ejection member 28 is thrust in the direction indicated by arrow B in FIG. 20 so as to be slid in the direction indicated by arrow B in FIG. 20 against the bias of the tension spring 30 which biases the ejection member 28 in the direction opposite to that indicated by arrow B in FIG. 20. When the ejection member 28 is slid in the direction indicated by arrow B in FIG. 20, the cam 207 thrusts the inclined surface section 197 formed on the lower side of the projection 196 provided on the second rotation supporting arm 184 of the lid 29 to rotate the lid 29 in the direction opposite to that indicated by arrow E in FIG. 20, that is in a direction of opening the insertion/ejection opening 21 of the holder 13, against the bias of the torsion spring 189. Simultaneously the thrusting portion 210 formed on the operating piece 209 thrusts the thrust portion 134 of the rotary arm 131 in the direction indicated by arrow C in FIG. 20 to rotate the rotary arm 131 in the same direction. The thrusting portion 133 formed at one end of the rotary arm 131 thrusts the second engaging projection 178 of the holder 13 to slide the holder 13 in the direction opposite to that indicated by arrow B in FIG. 17. The holder 13 is slid in the direction opposite to that indicated by arrow B in FIG. 17 under the force of thrusting by the thrusting portion 133 of the rotary arm 131 on the second engaging projection 178 of the holder 13. When the holder 13 is slid in the direction opposite to that indicated by arrow B in FIG. 17, the toggle spring 27 is inverted to its first state of biasing the holder 13 in the direction opposite to that indicated by arrow B in FIG. 17 to bias the holder to the insertion/ejection direction to shift the holder 13 to the insertion/ejection position.

The sequence of operation which takes place as from the time of insertion of the plate-shaped memory 1 into the loading device 120, configured as described above, until the time of recording or reproduction of information signals on or from the semiconductor memory in the plate-shaped memory 1, is now explained. It is first assumed that the loading device 120 is in non-use state. The holder 13 is in the insertion/ejection position towards the front side of the chassis 14, with the toggle spring 27 interconnecting the chassis 14 and the holder 13 being in the first state of biasing the holder 13 towards the insertion/ejection position on the front side of the chassis 14.

The lid 29 is rotationally biased, by the torsion spring 189 engaged by the retainer 192 provided on the lid 29 and by the retainer 193 provided on the chassis 14, in the direction of closing the front side of the chassis 14, as indicated by arrow E in FIGS. 19 and 20, for closing the front side of the chassis 14 and the insertion/ejection opening 21 of the holder 13 in the insertion/ejection position. The lid 29 prevents dust and dirt from intruding into the inside of the loading device 120.

The rotary arm 131 has been rotated in the direction indicated by arrow C in FIG. 17 so that the thrusting portion 133 is positioned on the front face of the chassis 14. The control member 161 mounted on the first sidewall section 16 of the chassis 14 is rotationally biased in the direction indicated by arrow D in FIG. 18 by a torsion spring 167, one arm 167b of which is engaged by a retainer 168 provided on the sidewall section 145 and the other arm 167c of which is engaged by a retainer 169 formed on the rotary arm 131, as shown in FIG. 18. The control member 161 is in such a state in which a retainer 165 at the distal end is engaged with the back surface in the vicinity of the opening 164 formed in the memory support plate 18 of the holder 13, with the engagement projection 163 at the distal end intruding into the inside of the holder 13 and with the control hole 166 not being engaged by the engagement projection 170 provided on the bottom plate of the chassis 14. That is, the holder 13 is movable in the direction indicated by arrow B in FIG. 17, that is towards the back surface of the chassis 14, by the control hole 166 of the control member 161 not being engaged by the engagement projection 170 of the chassis 14.

The ejection member 28 has been slid in the direction opposite to that indicated by arrow B in FIGS. 17 and 20, towards the front side of the chassis 14, by the tension spring 30 being engaged by the spring retainer 211 provided on the ejection member 28 and by the spring retainer 212 provided on the chassis 14.

This state is the above-mentioned state shown in FIG. 7 in which the user is able to view the display mark 26 provided on the cover plate 25 through the second window 56 provided in the housing 12 so that the user is able to discriminate readily the direction of insertion of the plate-shaped memory 1 into the recording and/or reproducing apparatus 11.

Figure 21:
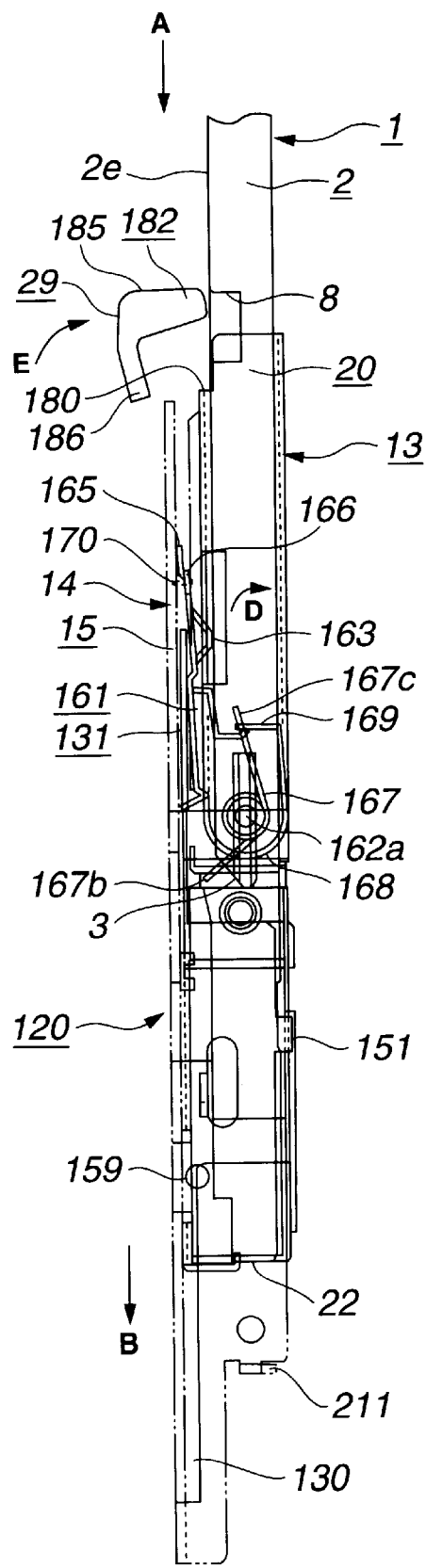
FIG. 21 is a side view of the loading device showing the state in which the plate-shaped memory has been inserted into the loading device.

Into the above-described loading device 120, in the non-use state, the plate-shaped memory 1 is inserted with the front side fitted with the terminal unit 3 as an inserting end and with the major surface 2a facing down towards the bottom plate 15 of the chassis 14, as shown in FIG. 21. When the plate-shaped memory 1 is inserted at the front surface of the loading device 120, the lid 29 is rotated in the direction opposite to that indicated by arrow E in FIG. 20, for opening the insertion/ejection opening 21 of the holder 13 in the insertion/ejection position on the front surface of the chassis 14, against the bias of the torsion spring 189 biasing the lid 29 in the direction of closing the front side of the chassis 14, as indicated by arrow E in FIG. 20, such as by acting on the front surface of the plate-shaped memory 1 with the hand or finger.

At the same time as the front side of the chassis 14 is opened by the lid 29, the plate-shaped memory 1 is inserted via the insertion/ejection opening 21 of the holder 13, with the terminal unit 3 as the inserting end, as shown in FIG. 21.

Referring to FIGS. 16 and 21, when an area defined between the distal end on the front surface of the plate-shaped memory 1 and the engagement recess 8 formed on the major surface 2a is moved on the control member 161 facing the holder 13 in the direction indicated by arrow B in FIG. 21, the control member 161 is rotated in the direction opposite to that indicated by arrow D in FIG. 21, with the pivot 162a as the center of rotation, against the force of the torsion spring 167, by the engagement projection 163 of the control member 161 intruded into the holder 13 being thrust by the area between the distal end of the plate-shaped memory 1 and the engagement recess 8 formed in the major surface 2a. By rotation of the control member 161 in the direction opposite to that indicated by arrow D, the control hole 166 of the control member 161 is engaged by the engagement projection 170 on the chassis 14, as shown in FIGS. 18 and 21, so that the holder 13 in the insertion/ejection position on the front surface side of the chassis 14 is inhibited from sliding in the direction indicated by arrow B in FIG. 21 towards the back surface of the chassis 14 as the plate-shaped memory 1 is introduced into the holder 13. The holder 13 is locked in the insertion/ejection position by the control member 161 until the terminal unit 3 of the plate-shaped memory 1 is connected to the first connection terminal 23 to the connector 22 provided on the holder 13, so that the electrode 3b forming the terminal unit 3 is reliably connected to the first connection terminal 23 of the connector 22.

Figure 22:
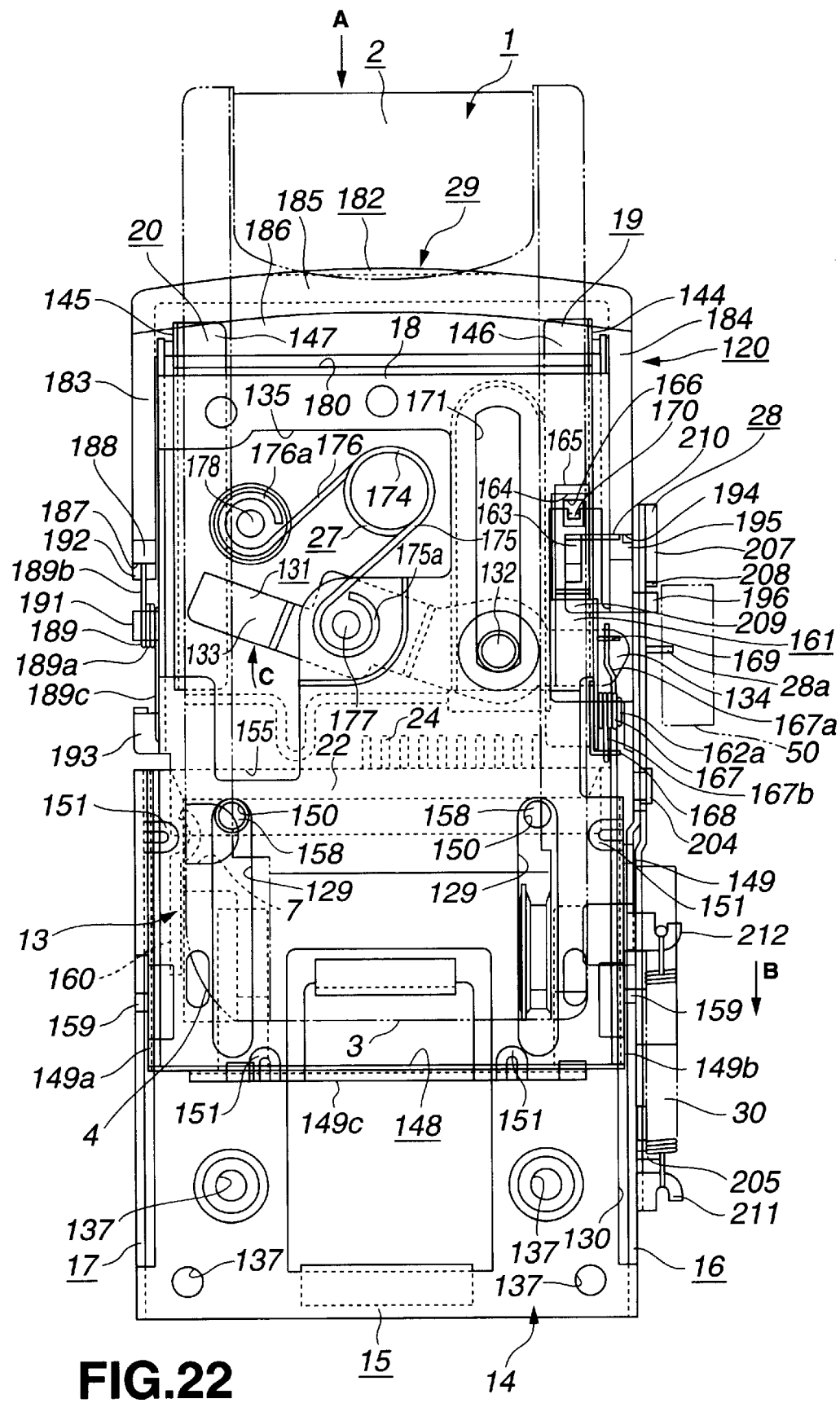
FIG. 22 is a plan view of a loading device showing the state in which the plate-shaped memory has been fully inserted into the holder in the loading/unloading position on the front chassis surface side.
Figure 23:
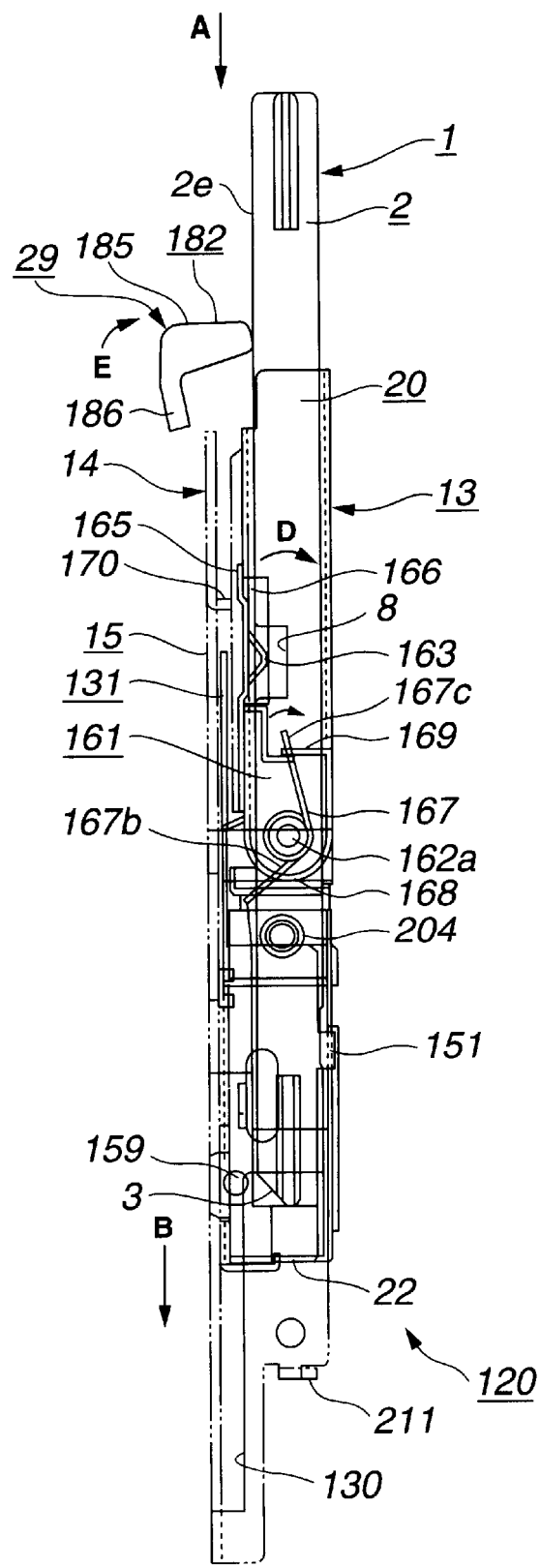
FIG. 23 is a plan view thereof.

When the plate-shaped memory 1 is further introduced into the loading device 120, the state shown in FIGS. 22 and 23 is reached. That is, when the holder 13 is in the insertion/ejection position on the front surface side of the chassis 14, and the plate-shaped memory 1 is fully introduced into the holder 13, which is in the insertion/ejection position, the plate-shaped memory 1 is intruded via the insertion opening 155 of the connector 22 provided on the back side of the holder 13. The first connection terminal 23 of the connector 22 is engaged in the engagement recesses 3c from the open end of the terminal unit 3 of the plate-shaped memory 1 to thrust the electrode 3b to establish electrical connection to the electrode 3b.

When the first connection terminal 23 is engaged in the engagement recesses 3c in the plate-shaped memory 1, and the electrode 3b is connected to the first connection terminal 23, the engagement recess 8 of the plate-shaped memory 1 is located above the engagement projection 163 of the control member 161 in the holder 13. The control member 161, rotated in the direction opposite to that indicated by arrow D in FIG. 23 by having the engagement projection 163 thrust by the area of the plate-shaped memory 1 extending from the distal end of the plate-shaped memory 1 to the engagement recess 8, is rotated in the direction indicated by arrow D in FIG. 23, under the force of the torsion spring 167, by the engagement recess 8 of the plate-shaped memory 1 and the engagement projection 163 of the control member 161 becoming engageable with each other. So, the engagement projection 163 is engaged in the engagement recess 8 of the plate-shaped memory 1. This disengages the engagement projection 170 of the chassis 14 from the control hole 166 of the chassis 14, so that the holder 13 can now be slid in the direction corresponding to the loading direction on the back surface of the chassis 14 as indicated by arrow B in FIGS. 22 and 23. When the plate-shaped memory 1 has been fully intruded into the holder 13, the elastic engagement piece 160 provided on the connector 22 is engaged in the detachment preventative recess 7 formed in the plate-shaped memory 1 to prevent the plate-shaped memory 1 from being detached from the holder. When engaged in the detachment preventative recess 7 in the plate-shaped memory 1, the elastic engagement piece 160 is elastically flexed to give the user a "click" feeling to make the user recognize the state of full insertion of the plate-shaped memory 1 into the holder 13, that is the state of positive engagement of the terminal unit 3 with the first connection terminal 23. That is, the user recognizes that the terminal unit 3 is positively engaged with the first connection terminal 23. This state, shown in FIG. 7, as described above, is a state in which the user is able to view the display mark 26 provided on the cover plate 25 through the second window 56.

If the plate-shaped memory 1 has not been intruded in the normal state into the loading device 120, that is if the plate-shaped memory 1 is inserted via the insertion/ejection opening 21 from the back side first or with the major surface 2a up, the engagement projection 163 of the control member 161 is not engaged in the engagement recess 8 of the plate-shaped memory 1, even if the plate-shaped memory 1 is introduced into the holder 13 in the insertion/ejection position. That is, even if the plate-shaped memory 1 is intruded up to a position indicated in FIGS. 22, 23, the control member 161 remains thrust against the major surface of the plate-shaped memory 1, because there is no engagement recess 8 of the plate-shaped memory 1 over the engagement projection 163 of the control member 161 in the holder 13. That is, the control hole 166 continues to be engaged by the engagement projection 170 of the chassis 14. So, the holder 13 in the insertion/ejection position is prohibited from sliding in the direction indicated by arrow B in FIG. 21 on the back surface of the chassis 14 with insertion of the plate-shaped memory 1. Thus, if, in the loading device 120, the plate-shaped memory 1 is inserted erroneously, the holder 13 in the insertion/ejection position is prohibited from sliding in the direction corresponding to the loading direction on the back surface of the chassis 14, as indicated by arrow B in FIGS. 22, 23, to prevent mistaken insertion of the plate-shaped memory 1. If the plate-shaped memory 1 is not intruded in the normal state, the elastic engagement piece 160 is not engaged in the detachment preventative recess 7 of the plate-shaped memory 1 to prohibit the plate-shaped memory 1 from being introduced into the holder in the insertion/ejection position until the first connection terminal 23 is engaged with the engagement recesses 3c of the terminal unit 3 to establish electrical connection with the electrode 3b to prevent mistaken insertion of the plate-shaped memory 1.

If, after the plate-shaped memory 1 is fully inserted into the holder 13 in the insertion/ejection position on the front surface side of the chassis 14, the plate-shaped memory 1 is further thrust in the direction indicated by arrow A in FIGS. 22, 23, the plate-shaped memory 1 is fully accommodated and loaded in the loading device 120, to enable recording or reproduction of information signals on or from the semiconductor memory. That is, if, as shown in FIG. 24, the plate-shaped memory 1 is further thrust from the state shown in FIGS. 22, 23, the engagement projection 170 of the chassis 14 is disengaged from the control hole 166 of the control member 161 so that the holder 13 is now able to slide in the direction corresponding to the loading direction towards the back surface of the chassis 14, as indicated by arrow B in FIGS. 22, 23.

Figure 24:
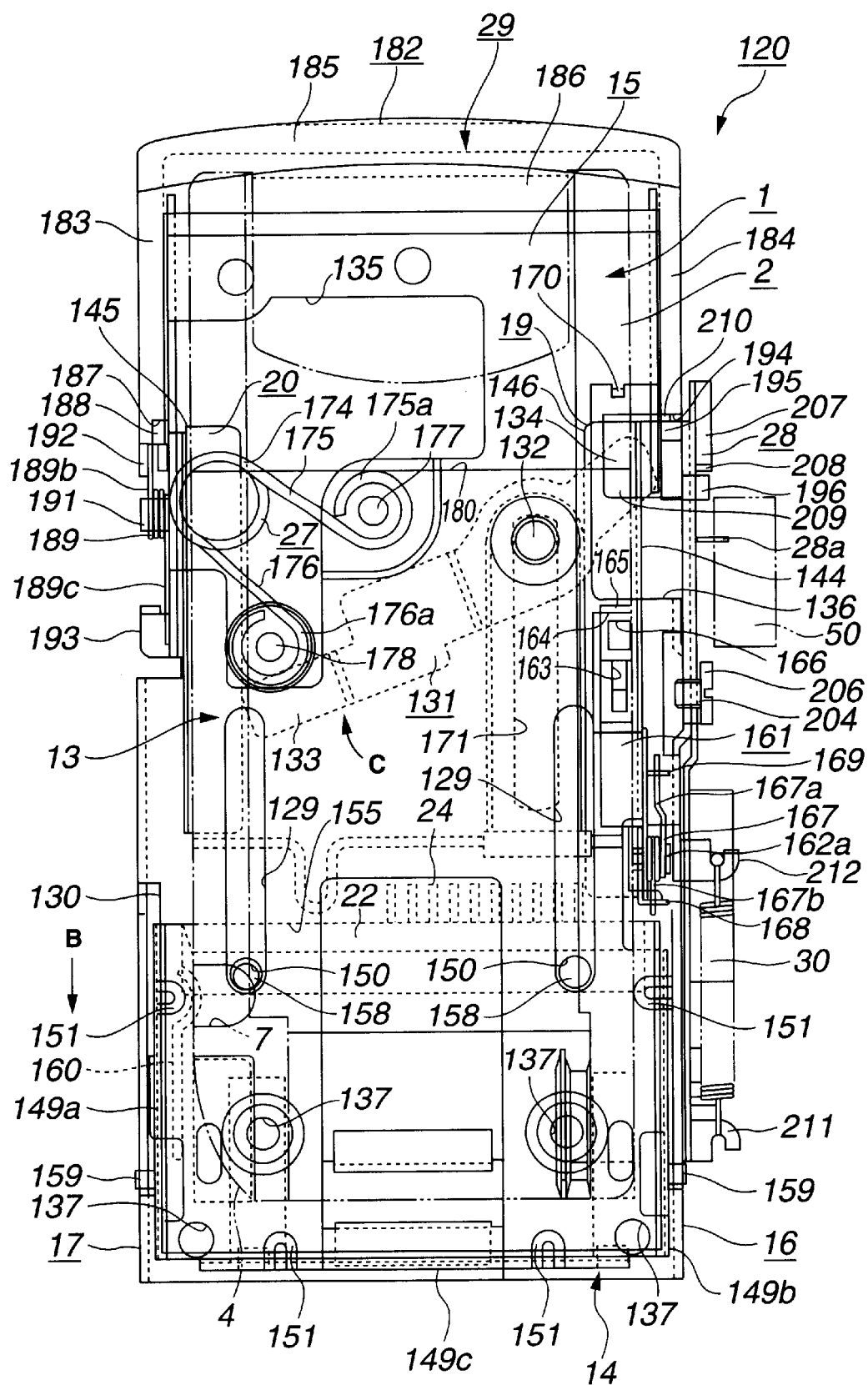
FIG. 24 is a plan view of the loading device showing the state in which the plate-shaped memory has been mounted on the loading device.

When the holder 13 is thrust by the plate-shaped memory 1 in the direction indicated by arrow B in FIG. 24, the toggle spring 27 is biased in the direction indicated by arrow B in FIG. 24 and is inverted from the first state to the second state of biasing the holder 13 in the direction opposite to that indicated by arrow B in FIG. 24. The holder 13 then is slid to the loading position on the back surface side of the chassis 14. This causes the plate-shaped memory 1 connected to the connector 22 to be completely accommodated in the loading device 120. The lid 29, inhibited from closing the front side of the chassis 14 by the rear surface of the plate-shaped memory 1, is rotated in the direction indicated by arrow E in FIG. 23, under the bias of the torsion spring 189, thus closing the front surface of the chassis 14 to prevent dust and dirt from intruding into the inside of the loading device 120. As the holder 13 is slid in the direction indicated by arrow B in FIG. 24, the rotary arm 131, rotatably mounted on the bottom plate 15 of the chassis 14, has the thrusting portion 133 on its one end thrust by the second engaging projection 178 engaged by the mating engaging portion 176a of the second arm 176 of the toggle spring 27, and is thereby rotated in the direction opposite to that indicated by arrow C in FIG. 24.

With the electrode 3b of the plate-shaped memory 1 connected to the first connection terminal 23 of the connector 22, the plate-shaped memory 1, loaded in position on the back surface side of the chassis 14, is controlled through a flexible wiring board connected to the second connection terminal 24 of the connector 22. Specifically, with the plate-shaped memory 1, thus loaded in position, information signals are written on the semiconductor memory enclosed in a main card member 2, by control signals from a data processing apparatus, such as a computer, or information signals are read out from the semiconductor memory. This state is shown in FIG. 8, in which the user is able to view the statement on the label 10 attached to the label affixing area 9 of the plate-shaped memory 1 loaded in the recording and/or reproducing apparatus 11 through the second window 56 provided in the housing.

The loading device 120, now carrying the plate-shaped memory 1 as described above, ejects the plate-shaped memory 1 from the loading device 120, as follows: If the operating portion 28a is thrust in the direction indicated by arrow B in FIGS. 25, 26 through the ejection unit 50 facing outwards from the casing of the main body portion of the electrical circuit apparatus, the ejection member 28 is slid in the direction indicated by arrow B in FIGS. 25, 26 against the bias of the torsion coil spring 30. The cam 207 of the ejection member 28 then thrusts the projection 196 provided on the second rotation supporting arm 184 of the lid 29 in the direction indicated by arrow B in FIGS. 25 and 26. Since the cam 207 is formed integrally with the bend 208 and the portion of the projection 196 facing the lower bend 208 is formed integrally with the inclined surface section 197, as shown in FIG. 20, the cam 207 is able to thrust the projection 196 positively. As the cam 207 thrusts the projection 196 of the lid 29 closing the front surface of the chassis 14 under the bias of the torsion spring 189, the lid 29 is rotated in the direction opposite to that indicated by arrow E in FIG. 26, under the force with which the cam 207 thrusts the projection 196 of the lid 29, against the force of the torsion spring 189, thereby opening the front surface of the chassis 14 to set the ejectable state of the plate-shaped memory 1.

Figure 25:
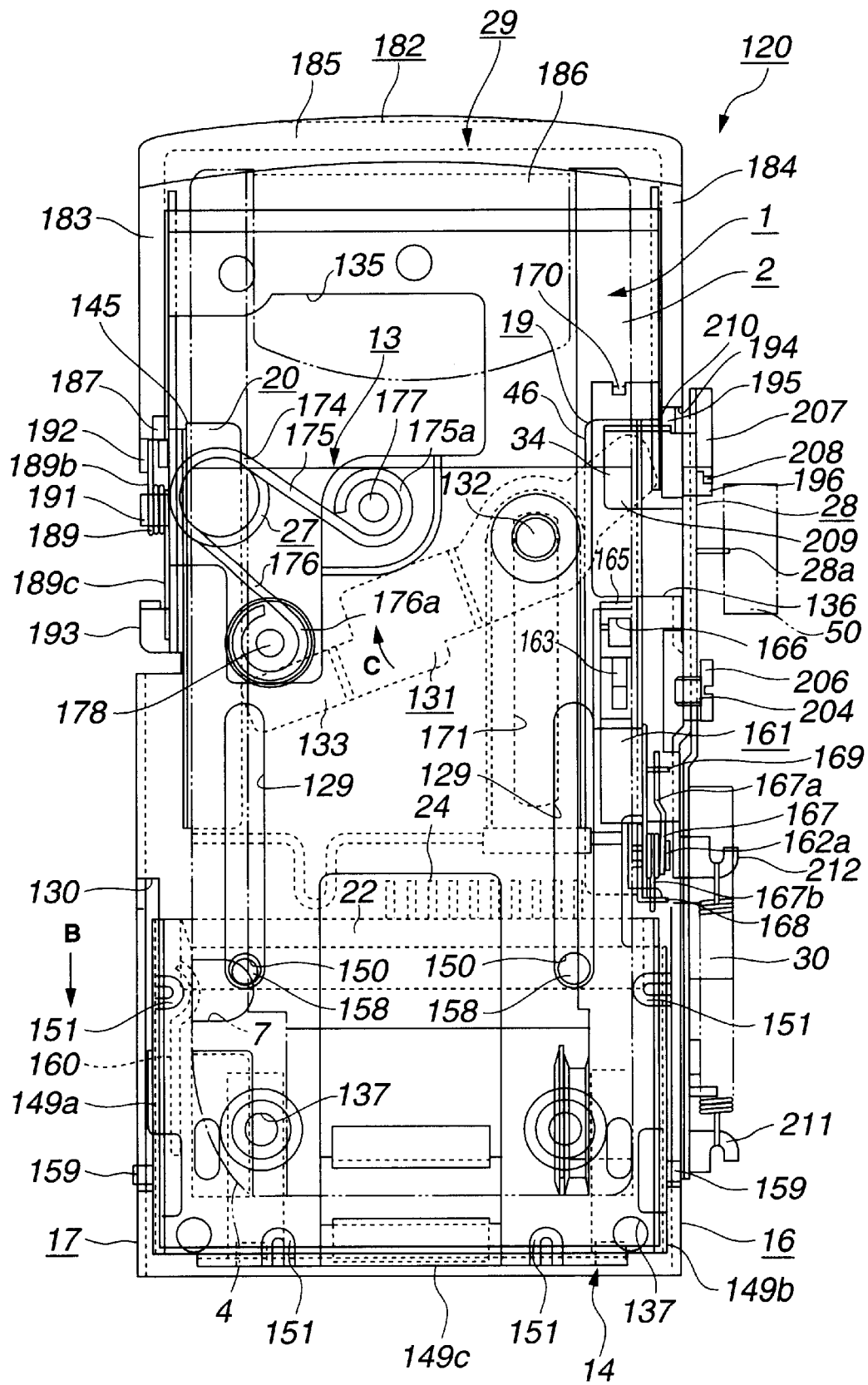
FIG. 25 is a plan view of the loading device showing an initial state when ejecting the plate-shaped memory mounted on the loading device.
Figure 26:
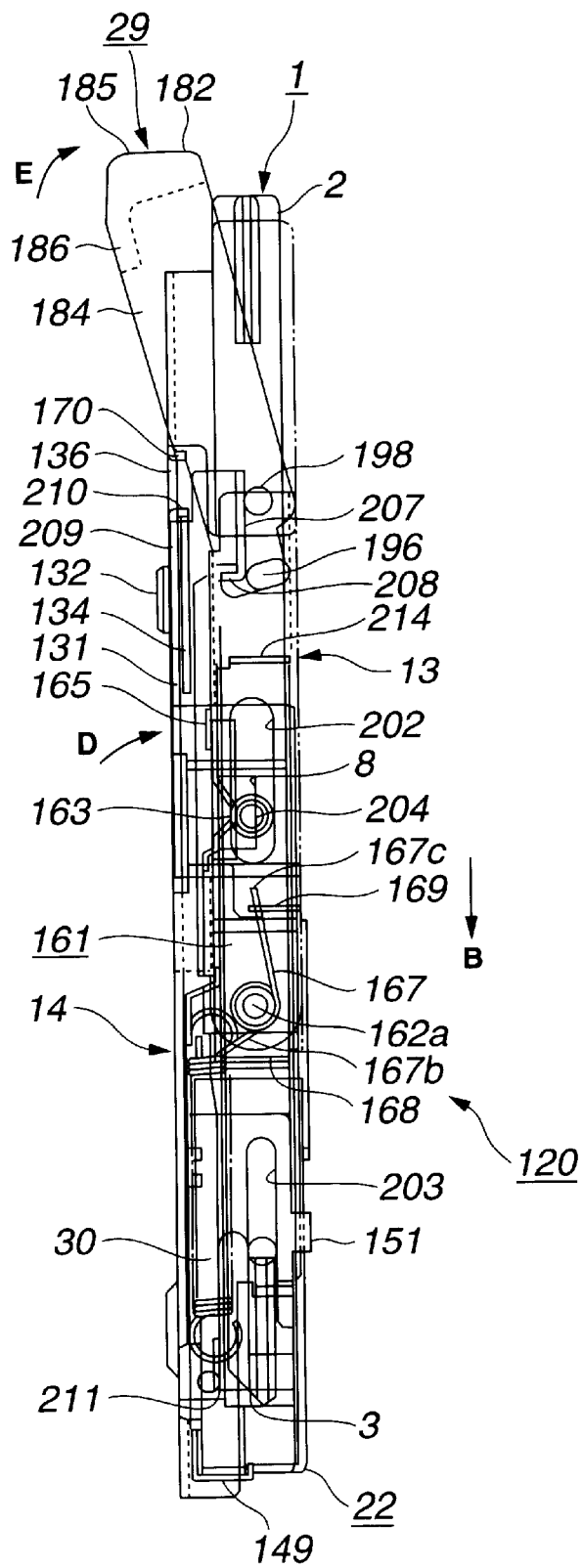
FIG. 26 is a side view of the loading device showing an initial state when ejecting the plate-shaped memory mounted on the loading device.

Simultaneously, the thrusting portion 210 provided on the operating piece 209 of the ejection member 28 is rotated in the direction opposite to that indicated by arrow C in FIG. 25, so that the thrust portion 134 compresses against the thrust portion 134 of the rotary arm 131 located on the side front surface of the chassis 14. When the ejection unit 50 is further slid in the direction indicated by arrow B in FIGS. 25 and 26, the thrusting portion 210 thrusts the thrust portion 134 of the rotary arm 131 to cause rotation of the rotary arm 131 in the direction indicated by arrow C in FIG. 25. The thrusting portion 133 of the rotary arm 131 then thrusts the second engaging projection 178 engaged by the mating engaging portion 176a of the second arm 176 of the toggle spring 27, under the force with which the thrusting portion 210 of the ejection member 28 thrusts the thrust portion 134 of the rotary arm 131. The toggle spring 27 in the second state of interconnecting the chassis 14 and the holder 13 is inverted to revert to the state of biasing the holder 13 in the direction indicated by arrow B in FIGS. 25 and 26 to cause the sliding of the holder 13 in the direction indicated by arrow B in FIGS. 25 and 26. The holder 13, which has so far been on the back surface side of the chassis 14, is thereby slid to the insertion/ejection position on the front surface side of the chassis 14 to cause the back surface of the plate-shaped memory 1 held thereby to face to out side of the loading device 120.

The plate-shaped memory 1, the back surface of which faces outwards from the front surface of the chassis 14, is extracted by the user from the holder 13, which is in the insertion/ejection position on the front surface of the chassis 14, to disconnect the terminal unit 3 of the plate-shaped memory 1 from the first connection terminal 23 of the connector 22. The lid 29 then is rotated in the direction of closing the front surface of the chassis 14 as indicated by arrow E in FIGS. 25 and 26 to close the insertion/ejection opening 21 of the holder in the insertion/ejection position and the front surface of the chassis 14 to prevent dust and dirt from intruding into the loading device 120.

When ejecting the plate-shaped memory 1, the loading device 120 of the plate-shaped memory 1, constructed as described above, simply moves the holder 13 in the loading position on the back surface side of the chassis 14 to the insertion/ejection position on the front surface of the chassis 14, under the force of thrusting the ejection operating unit provided on the casing of the main body portion of the apparatus by the user, without releasing the state of engagement between the first connection terminal 23 of the connector 22 mounted on the holder 13 and the electrode 3b of the terminal unit 3 of the plate-shaped memory 1. That is, in this loading device 120, ultimate removal of the plate-shaped memory 1 is by the manual operation by the user. So, in the present loading device 120, the manual force of operating the ejection operating unit is smaller than in the loading device in which the engaged state of the first connection terminal 23 of the connector 22 with the electrode 3b of the terminal unit 3 of the plate-shaped memory 1 is released by thrusting an ejection button, thus enabling facilitated ejection of the plate-shaped memory 1. In case of mistaken insertion of the plate-shaped memory 1, the control hole 166 keeps on to be engaged with the engagement projection 170 of the chassis 14 on the chassis 14, thus preventing mistaken insertion of the plate-shaped memory 1 into the loading device 120.

As means for preventing mistaken insertion of the plate-shaped memory 1 into the loading device 120, the control member 161 is used as an example in the above explanation. Alternatively, the following means for preventing mistaken insertion of the plate-shaped memory 1 may be used. Since the loading device 120, now explained, is approximately similar in structure to the loading device 120 except the control member, the same reference numerals are used to depict the same parts as those of the loading device 120, and the corresponding description is omitted for simplicity.

Figure 27:
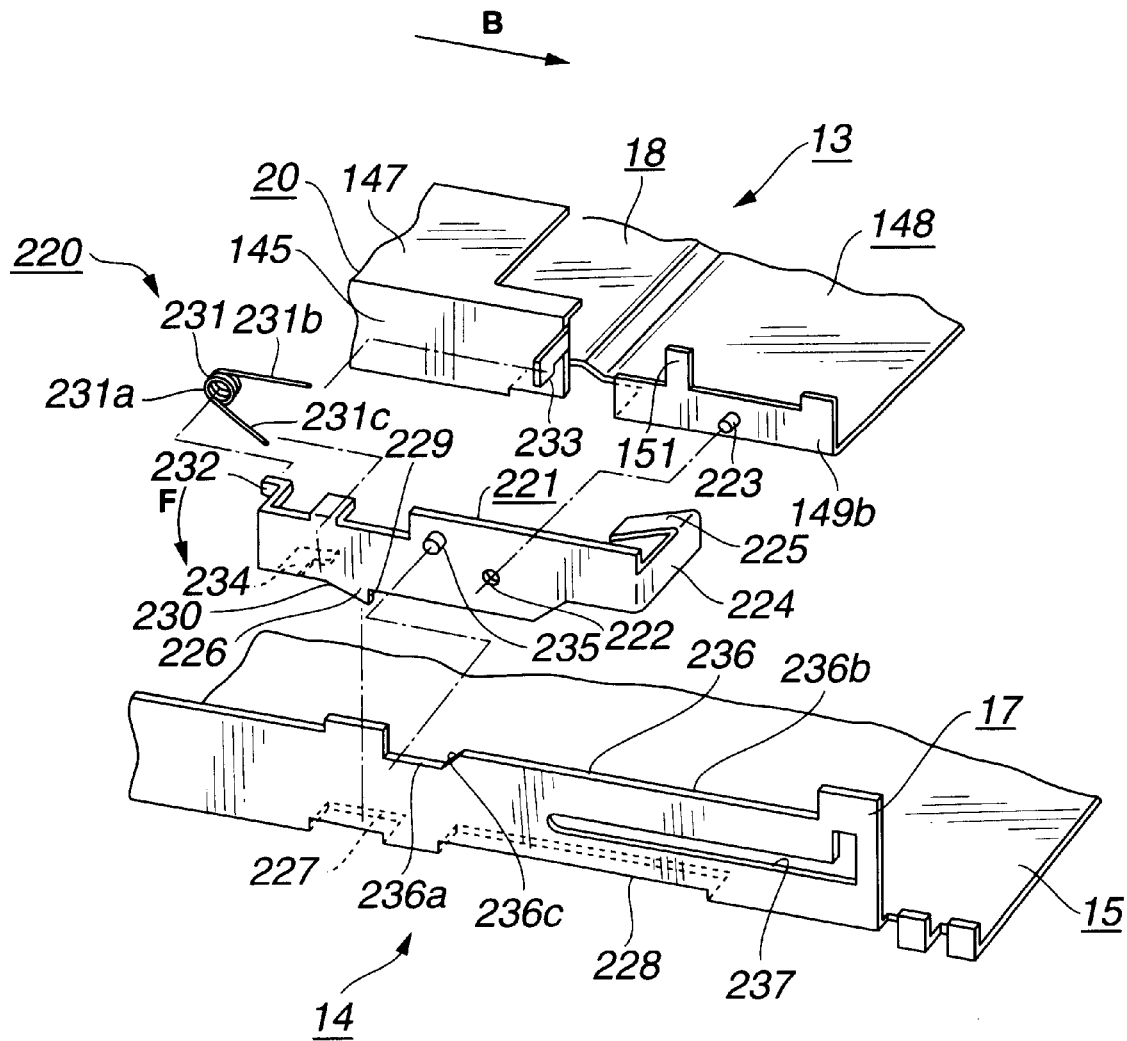
FIG. 27 is an exploded perspective view showing a modification of a loading device for a plate-shaped memory.

The loading device 220 includes, towards the sidewall section 145 making up the holder 13, a control member 221 adapted for prohibiting the holder 13 from moving from the insertion/ejection position on the front side of the chassis 14 towards the back surface of the chassis 14, as shown in FIG. 27. The control member 221 is elongated so as to be mounted along the sidewall section 145 of the holder 13. The control member 221 is provided with a mid supporting hole 222. This supporting hole 222 is passed through by a pivot 223 provided on a control wall section 149b of a connector mounting portion 148, mounted side-by-side to the sidewall section 145 of the holder 13, whereby the control member 221 is mounted for rotation in the direction indicated by arrow F and in the direction opposite to that indicated by arrow F in FIG. 27. In the loading device 220, the holder 13 is opened on its back side.

When the control member 221 is mounted on the control wall section 149b, a piece 224 of the rear end of the control member 221 towards the back surface of the holder 13 is bowed substantially at right angle towards the inside of the holder 13. When the plate-shaped memory 1 is intruded into the holder 13, a thrust portion 225 of the bowed portion 224 is acted on and thrust by an inclined surface section 3a formed at the inserting end of the plate-shaped memory 1. This thrust portion 225 faces the inside of the holder 13 from the back surface side of the holder 13, and is bent at an acute angle from the upper end towards the lower side of the bowed portion 224, so that, when the plate-shaped memory 1 is inserted in a regular state into the holder 13, the thrust portion 225 will face the inclined surface section 3a of the plate-shaped memory 1.

On a mid portion of the lower end of the control member 221, there is protuberantly formed a control portion 226 controlling the movement from the insertion/ejection position to the loading position of the holder 13. When the holder 13 is locked in the insertion/ejection position on the front surface side of the chassis 14, the control portion 226 is engaged in an engagement hole 227 formed across the bottom plate 15 and the second sidewall section 17 of the chassis 14. Extending across the bottom plate 15 and the second sidewall section 17 of the chassis 14 is a slit 228 in the back surface of the chassis 14 for serving as clearance for the control portion 226 from the engagement hole 227. The rear end of the control portion 226 is provided with a vertical surface section 229 to prevent the holder 13 in the insertion/ejection position from moving to the loading position on the back surface of the chassis 14 until insertion of the plate-shaped memory 1 into the holder 13 in the insertion/ejection position. The control portion 226 is formed integrally with an inclined surface section 230 in order to permit the smooth riding thereon of the forward end of the slit 228 when the holder 13 is moved from the loading position on the back surface of the chassis 14 to the insertion/ejection position on the front surface thereof for ejecting the plate-shaped memory 1 from the holder 13.

The control member 221 is mounted for rotation in the direction indicated by arrow F and in the direction opposite to that indicated by arrow F in FIG. 27, by having pivot 223 on the control wall section 149b of the holder 13 passed through the supporting hole 222. The control member 221 is biased at this time into rotation in the direction indicated by arrow F in FIG. 27 by a torsion spring 231 operating as a biasing member. The torsion spring 231 has its coil portion 231a mounted on a mounting piece 232 provided at the forward end of the control member 221 opposite to the rear end formed integrally with a thrust portion 225. This torsion spring 231 has its one arm 231b engaged by a retainer 233 formed on the sidewall section 145 constituting the holder 13, while having the other arm 231c engaged by a retainer 234 formed at the lower end of the control member 221. The torsion coil spring 231 biases the control member 221 in the direction indicated by arrow F in FIG. 27, while engaging the control portion 226 in the engagement hole 227.

The control member 221, biased in the direction indicated by arrow F in FIG. 27, is provided with a rotation control projection 235 for preventing excessive rotation in the direction indicated by arrow F in FIG. 27. The rotation control projection 235 is engaged in a cam 236 at the upper end of the second sidewall section 17 of the chassis 14. When the holder 13 is at the insertion/ejection position on the front surface side of the chassis 14, the rotation control projection 235 is engaged with a first horizontal surface section 236a of the rotation control projection 235. When the holder 13 is at the insertion/ejection position on the rear surface side of the chassis 14, the rotation control projection 235 is engaged with a second horizontal surface section 236b of the rotation control projection 235. The cam 236 is made up of a first horizontal surface section 236a, a second horizontal surface section 236b and an inclined surface section 236c interconnecting the first and second horizontal surface sections 236a, 236b. The first horizontal surface section 236a is lower by one step than the second horizontal surface section 236b. When the holder 13 is moved from the insertion/ejection position to the loading position, the rotation control projection 235 is moved over the first horizontal surface section 236a, inclined surface section 236c and the second horizontal surface section 236b in this order.

Meanwhile, the pivot 223 of the holder 13, passed through the supporting hole 222 of the control member 221, is engaged in a guide hole 237 formed in the second sidewall section 17 of the chassis 14 for extending along the movement direction of the holder 13.

Figure 28:
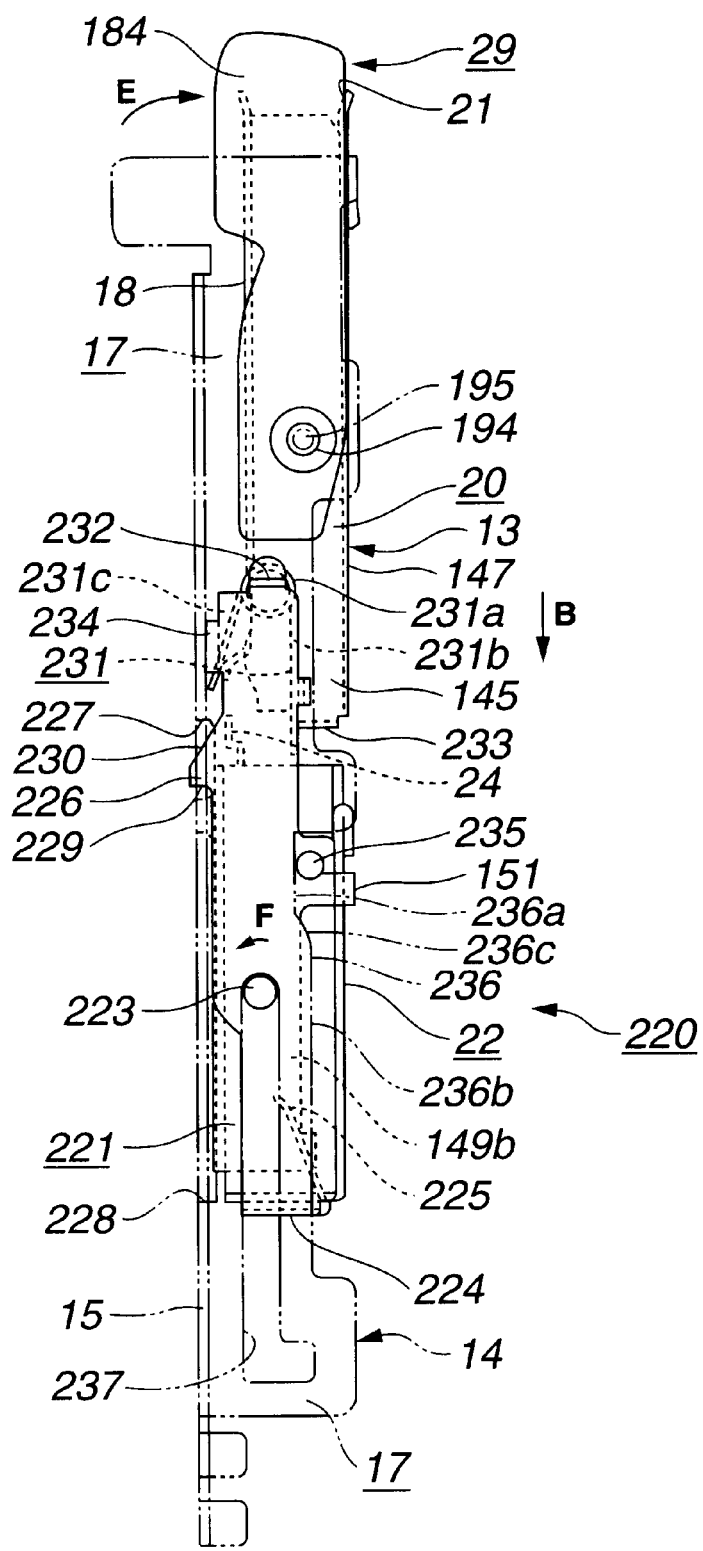
FIG. 28 is a side view showing the state of non-use of the loading device.

The sequence of operations as from insertion of the plate-shaped memory 1 into the loading device 220 until recording or reproduction of information signals on or from the semiconductor memory of the plate-shaped memory 1 is now explained. First, referring to the loading device 220 in the non-use state, the holder 13 is in the insertion/ejection position in which the holder 13 has been moved to the front surface side of the chassis 14, as shown in FIG. 28. The control member 221 is rotated at this time about the pivot 223 as the center of rotation, under the bias of the torsion spring 231, in the direction indicated by arrow F in FIG. 28, with the control portion 226 remaining engaged in the engagement hole 227 of the chassis 14. Thus, the holder 13, carrying the control member 221, remains locked in the insertion/ejection position on the front surface of the chassis 14. The rotation control projection 235 of the control member 221 is engaged at this time with the first horizontal surface section 236a forming the cam 236.

This state is shown in FIG. 7, in which the user is able to view the display mark 26 provided on the cover plate 25 through the second window 56 provided in the housing 12. So, the user is able to discriminate the direction of insertion of the plate-shaped memory 1 into the recording and/or reproducing apparatus 11 readily.

Figure 29:
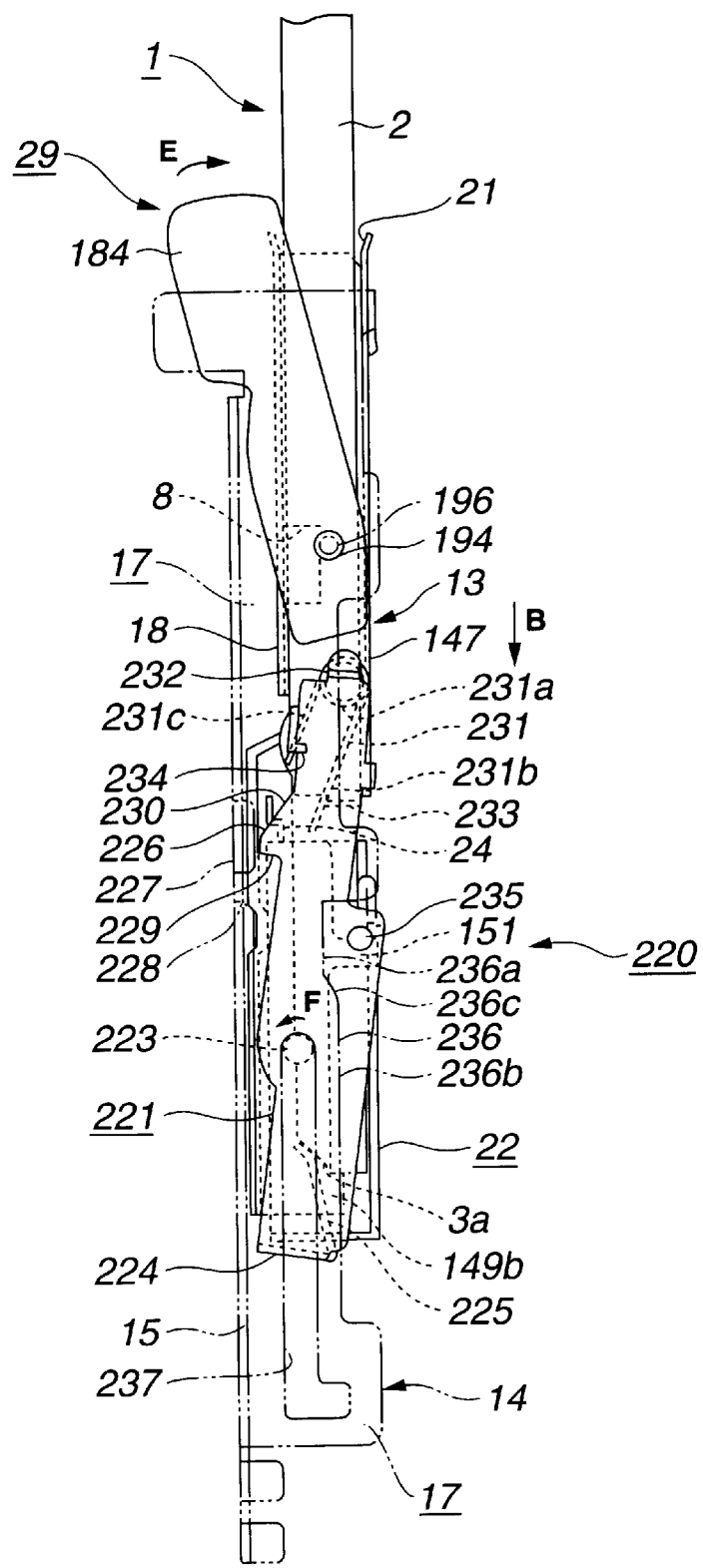
FIG. 29 is a side view of a loading device showing the state in which the plate-shaped memory has been fully inserted into the holder in the loading/unloading position on the front chassis surface side.

In the above-described loading device 220, the plate-shaped memory is intruded int the holder 13 locked by the control member 221 in the insertion/ejection position, with the terminal unit 3 as an inserting end, as shown in FIG. 29. When the plate-shaped memory 1 is inserted at the front surface of the loading device 220, the lid 29 is rotated, such as by catching the hand or finger or the front surface section of the plate-shaped memory 1 on the lid, in the direction of opening the front surface of the chassis 14, as indicated by arrow E in FIG. 29, for opening the insertion/ejection opening 21 of the holder 13.

At the same time as the front surface of the chassis 14 is opened, the plate-shaped memory 1 is inserted via the insertion/ejection opening 21 of the holder 13, with the terminal unit 3 of the plate-shaped memory 1 as the inserting end, as shown in FIG. 29. The first connection terminal 23 of the connector 22 is engaged at this time with the engagement recesses 3c from the open end of the terminal unit 3 of the plate-shaped memory 1 so as to be electrically connected to the electrode 3b as the first connection terminal 23 thrusts the electrode 3b. The control portion 226 of the control member 221 is engaged with the engagement hole 227 of the chassis 14, until the first connection terminal 23 is electrically connected to the electrode 3b, with the holder remaining locked in the insertion/ejection position. So, the first connection terminal 23 is engaged in the engagement recesses 3c of the plate-shaped memory 1 for positively establishing the electrical connection to the terminal 7. When the plate-shaped memory 1 is fully inserted into the holder 13 which is in the insertion/ejection position, the thrust portion 225 of the control member 221 is thrust against the inclined surface section 3a of the plate-shaped memory 1. The control member 221 then is rotated in the direction opposite to that indicated by arrow F in FIG. 29, against the bias of the torsion spring 231, about the pivot 223 as the center of rotation, to release the engaged state of the control portion 226 with the engagement hole 227 to enable the holder 13 to be moved from the insertion/ejection position on the front surface side of the chassis 14 to the loading position on the back surface side. This state is that shown in FIG. 7 in which the user is able to view the display mark 26 provided on the cover plate 25 through the second window 56.

If the plate-shaped memory 1 has not been inserted in a normal state into the loading device 220 as described above, the first connection terminal 23 is not engaged with the engagement recesses 3c forming the terminal unit 3 of the plate-shaped memory 1, whilst the thrust portion 225 of the control member 221 is not thrust against the inclined surface section 3a of the plate-shaped memory 1. The control member 221 is not rotated in the direction opposite to that indicated by arrow F in FIG. 28, with the control portion 226 remaining engaged in the engagement hole 227 to keep the holder 13 locked in the insertion/ejection position. Thus, if, in the loading device 220, the plate-shaped memory 1 has been inserted erroneously, the holder 13 in the insertion/ejection position is prohibited for sliding in the direction corresponding to the loading direction towards the back surface of the chassis 14, as indicated by arrow B in FIG. 28, thereby preventing mistaken insertion of the plate-shaped memory 1.

Figure 30:
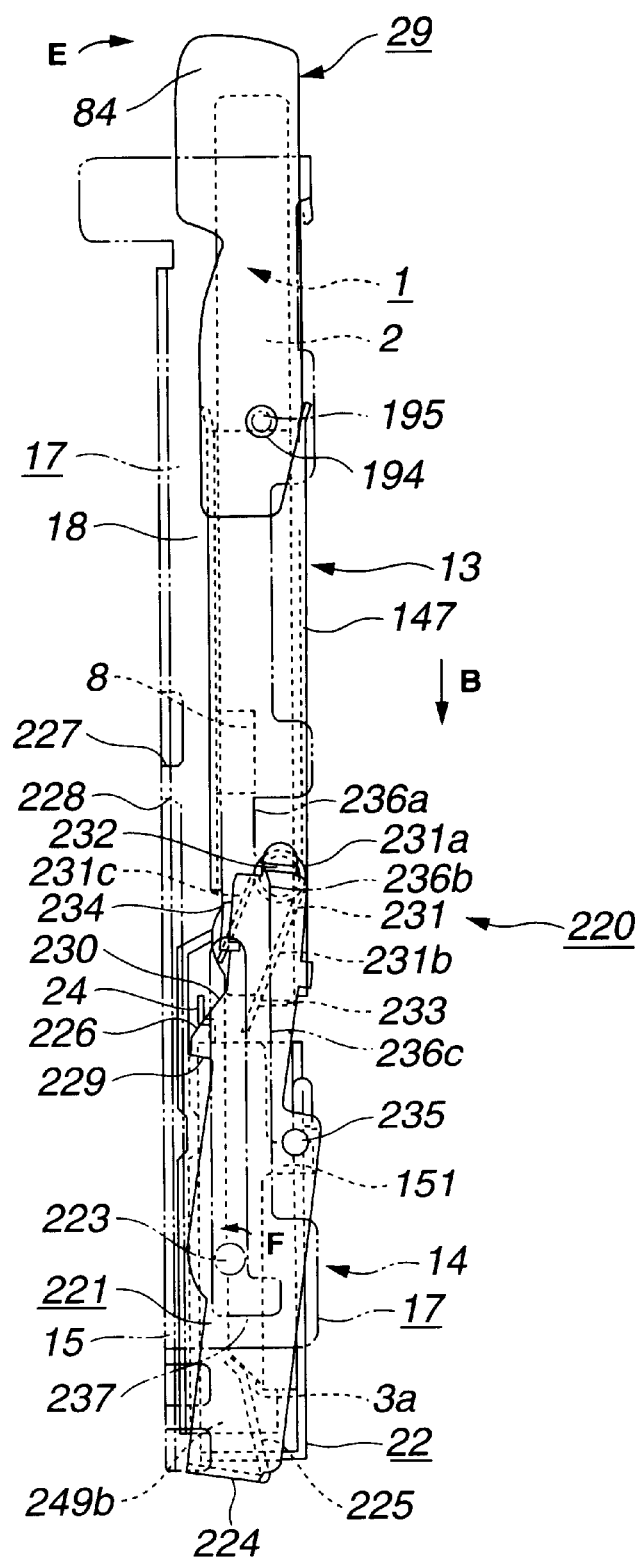
FIG. 30 is a side view of the loading device showing the state in which the plate-shaped memory has been mounted on the loading device.

If, after the plate-shaped memory 1 has been intruded fully into the holder 13 which is in the insertion/ejection position on the front side of the chassis 14, the plate-shaped memory 1 is further thrust in the direction indicated by arrow B in FIG. 29, the plate-shaped memory 1 is fully housed in the loading device 220 and thereby loaded in the loading device 220 to enable the information signals to be recorded and reproduced on or from the semiconductor memory, as shown in FIG. 30. That is, the holder 13 in the insertion/ejection position on the front surface side of the chassis 14, as shown in FIG. 30, is moved to the loading position towards the back surface side of the chassis 14, with the control member 221 being rotated in the direction opposite to that indicated by arrow F in FIG. 30 to release the engaged state of the control portion 226 with the engagement hole 227. The rotation control projection 235 of the control member 221 is moved at this time from the first horizontal surface section 236a of the cam 236 through the inclined surface section 236c to the second horizontal surface section 236b higher in level by one step from the first horizontal surface section 236a. The control member 221, thus moved to the second horizontal surface section 236b one step higher in level than the first horizontal surface section 236a, is prevented from rotating in the direction indicated by arrow F in FIG. 30 under the bias of the torsion spring 231. The lid 29 is rotated in the direction indicated by arrow E in FIG. 30 to close the insertion/ejection opening 21 of the holder 13 and the front surface of the chassis 14 to prevent dust and dirt from intruding into the inside of the loading device 220.

This state is that shown in FIG. 8 in which the user is able to view the statements on the label 10 bonded to the label affixing area 9 of the plate-shaped memory 1 loaded in the recording and/or reproducing apparatus 11 through the second window 56 provided in the housing 12.

With the above-described loading device 220, having the plate-shaped memory 1 loaded as described above, the plate-shaped memory 1 is ejected from the loading device 220 as follows: That is, if the ejection unit 50 provided facing outwards from the casing of the main body portion of the apparatus is acted on, the holder 13 in the insertion/ejection position on the back surface side of the chassis 14 is moved to the insertion/ejection position on the front surface side of the chassis 14. The control member 221, rotated in the direction opposite to that indicated by arrow F in FIG. 30 against the bias of the torsion spring 231, is enabled to be rotated in the direction indicated by arrow F in FIG. 29, by the rotation control projection 235 being moved from the second horizontal surface section 236b forming the cam 236 to the first horizontal surface section 236a one step lower in level than the second horizontal surface section 236b. Since the plate-shaped memory 1 has been inserted into the holder 13, the control member 221 has been thrust against the inclined surface section 3a and is kept in the state of having been rotated in the direction opposite to that indicated by arrow F in FIG. 29. The back surface side of the plate-shaped memory 1 faces outwards from the insertion/ejection opening 21 of the holder 13 to outside.

By the plate-shaped memory 1 being extracted from the holder 13 in the insertion/ejection position by the user, the connection between the terminal 3 of the plate-shaped memory 1 and the first connection terminal 23 of the connector 22 is released. Simultaneously, the thrust portion 225 of the control member 221 is released from the thrust state by the inclined surface section 3a of the plate-shaped memory 1, whereby the thrust portion 225 is rotated in the direction indicated by arrow F in FIG. 28 under the bias of the torsion spring 231. This engages the control portion 226 of the control member 221 in the engagement hole 227 of the chassis 14 to lock the holder 13 in the insertion/ejection position on the front surface of the chassis 14. After complete extraction of the plate-shaped memory 1 from the loading device 220, the lid 29 is rotated in the direction indicated by arrow E in FIG. 28 to close the insertion/ejection opening 21 formed in the holder 13 in the insertion/ejection position to prevent dust and dirt from intruding into the inside of the loading device 220.

In the loading device 220, as in the above-described loading device 120, the operating force in ejecting the plate-shaped memory 1 from the loading device 220 may be reduced to improve convenience in use. Moreover, in this loading device 220, the thrust portion 225 of the control member 221 is thrust only when the plate-shaped memory 1 has been inserted in the regular state into the holder 13 in the insertion/ejection position to disengage the control member 226 from the engagement hole 227 in the chassis 227 of the chassis 14 to enable the holder 13 to be moved to the loading position on the back surface of the chassis 14 in which the information signals are to be recorded and/or reproduced. That is, if the plate-shaped memory 1 is not introduced in the regular state into the holder 13, the thrust portion 225 of the control member 221 is not thrust, with the state of engagement of the control member 226 with the engagement hole 227 not being released. So, with the present loading device 220, it is similarly possible to prevent mistaken insertion of the plate-shaped memory 1.

In the above-described embodiment, the control member is mounted on the holder 13. However, it suffices if the control member controls the movement of the holder 13 with respect to the chassis 14. So, the control member may be mounted on the chassis 14.

With the loading devices 120, 220, according to the present invention, the holder 13 holding the plate-shaped memory 1 is moved between the inserting/ejecting position and the loading position, as the holder 13 holds the plate-shaped memory 1. Thus, the cover plate 25 is mounted to the connector 22 and moved along with the holder 13, and hence the cover plate is moved along with the holder 13 in the second window 56 in association with the insertion/ejection of the plate-shaped memory 1. So, in the recording and/or reproducing apparatus 11, provided with the loading devices 120, 220, the size of the second window 56 is designed so that the amount of the area of the cover plate 25 facing the second window 56 will be changed with varying movement positions of the holder 13, whereby the state of the display mark 26 provided to the cover plate 25 is varied. Moreover, with the display mark 26, the user is able to discriminate readily whether the plate-shaped memory 1 has been inserted into the holder 13 or the plate-shaped memory 1 is ready to be intruded into the holder 13. That is, by setting the size of the second window 56 so that, when the holder 13 has been moved to a position of loading the plate-shaped memory 1 inserted and held in the recording and/or reproducing apparatus 11, a portion of the arrow making up the display mark 26, such as its pointed portion, is hidden, the user is able to recognize readily the state of insertion of the plate-shaped memory 1 into the holder 13.

Industrial Applicability

According to the present invention, in which a selection operating unit for selecting the operating mode or data stored in the memory is provided at a position towards one end from the mid portion of the main body portion of the apparatus, and in which an ejection unit for ejecting the plate-shaped memory loaded on the main body portion is provided at a position towards the opposite end from the mid portion of the main body portion, it is possible to prevent erroneous selection of the operating mode and the mistaken ejection operation of the plate-shaped memory. By employing a plate-shaped memory that can be reduced in size, it is possible to improve convenience in operation of the recording and/or reproducing apparatus.

Since the plate-shaped memory is introduced from the opposite end towards one end of the main body portion of an apparatus provided with an ejection unit, the plate-shaped memory protruded from the main body portion of the apparatus when acting on the ejection unit can be readily carried by the hand or finger, so that the memory can be prevented from being detached from the main body portion of the apparatus to realize positive ejection.

What is claimed is:

1. A recording and reproducing apparatus, comprising:
   a main body housing having a rectangular parallelepiped shape and on which a recording medium is removably loaded;
   a selection operation unit located at a side of the main body housing for operation by a user of the apparatus to select data stored in the recording medium;
   a unit for reproducing as sound to the user the data selected by the selection actuation portion; and
   an ejection unit located at said side of the main body housing for operation by a user in ejecting the recording medium loaded in the main body housing.

2. The recording and reproducing apparatus according to claim 1, wherein the selection operation unit is movable in a direction perpendicular to a surface of the main body housing and is rotatable about an axis of the selection operation unit of rotation.

3. The recording and reproducing apparatus according to claim 2, wherein the ejection unit is movable in a direction parallel to a longitudinal axis of the side of the main body housing upon which the ejection unit is located.

4. The recording and reproducing apparatus according to claim 1, wherein the ejection unit is movable in a direction of insertion of the recording medium into the main body housing to eject the recording medium loaded on the main body housing.

5. The recording and reproducing apparatus according to claim 1, wherein the side of the main body housing whereat the ejection unit is located is a first side and further comprising a recording medium insertion and ejection opening located on a second side of the main body housing adjacent the first side whereat the selection operation unit is located and the recording medium is inserted and ejected into and from said main body housing through said recording medium insertion and ejection opening.

6. The recording and reproducing apparatus according to claim 5, further comprising a display unit located on a third side forming a top surface of the main body housing for visually demonstrating to the user information pertinent to data stored in the recording medium.

7. The recording and reproducing apparatus according to claim 6, further comprising a window in a fourth side forming a bottom surface of the main body housing for exposing a portion of the recording medium loaded on the main body housing.

8. The recording and reproducing apparatus according to claim 7, wherein the window is covered by a transparent plate formed integrally with the main body housing.

9. The recording and reproducing apparatus according to claim 7, further comprising a cover plate arranged inside the main body housing for covering a connection terminal for making an electrical connection with the recording medium loaded on the main body housing, the cover plate facing outwards from the window.

10. The recording and reproducing apparatus according to claim 9, wherein the cover plate includes a symbol for indicating a direction of insertion of the recording medium into the main body housing and the symbol is visible through the window.

11. The recording and reproducing apparatus according to claim 7, wherein the window permits a label bonded to the recording medium to be viewed from the exterior of the main body housing through the window.

12. The recording and reproducing apparatus according to claim 9, further comprising a loading unit arranged inside the main body housing for loading the recording medium from a first position for inserting and ejecting the recording medium to a second position for housing the recording medium, wherein the cover plate partially covers the loading unit.

13. The recording and reproducing apparatus according to claim 12, wherein the connection terminal includes a first connection terminal connected to a terminal unit of the recording medium and a second connection terminal electrically connected to the recording medium through the first connection terminal, the cover plate overlying the second connection terminal.

14. A recording and reproducing apparatus, comprising:
a main body housing having a rectangular parallelepiped shape and on which a recording medium is removably loaded;
a holder for holding the recording medium, the holder being moved between a first position in which the recording medium is inserted into and ejected from the main body housing and a second position in which the recording medium is accommodated inside the main body housing;
a connector provided on the holder, the connector being connected to a terminal unit of the recording medium when the holder is in the first position;
a selection operation unit provided on a side of the main body housing for operation by a user of the apparatus to select data stored in the recording medium; and
an ejection unit located on said side of the main body housing for operation by the user in for ejecting the recording medium loaded on the main body housing.

15. The recording and reproducing apparatus according to claim 14, wherein the selection operation unit is movable in a direction perpendicular to a surface of said side of the main body housing and is rotatable about an axis of rotation of the selection operation unit.

16. The recording and reproducing apparatus according to claim 14, wherein the ejection unit is movable in a direction parallel to the side of the main body housing upon which the ejection unit is located.

17. The recording and reproducing apparatus according to claim 14, wherein the ejection unit is movable along a direction of insertion of the recording medium into the main body housing to eject the recording medium loaded on the main body housing.

18. The recording and reproducing apparatus according to claim 14, wherein the side of the main body housing whereat the ejection unit is located is a first side and further comprising an insertion and ejection opening located on a second side of the main body housing adjacent the first side where the selection operation unit is located, wherein the recording medium is inserted and ejected into and from the main body housing through the insertion and ejection opening.

19. The recording and reproducing apparatus according to claim 14, further comprising a display portion located on a third side forming a top surface of the main body housing for visually demonstrating to the user information pertinent to data stored on the recording medium.

20. The recording and reproducing apparatus according to claim 14, further comprising a window formed in a fourth side forming a rear surface of the main body housing for exposing a portion of the recording medium loaded on the main body housing.

21. The recording and reproducing apparatus according to claim 20, wherein the window is covered by a transparent plate formed integrally with the main body housing.

22. The recording and reproducing apparatus according to claim 20, wherein the connector includes a cover plate for covering a connection terminal for electrical connection to the recording medium, wherein the cover plate is visible through the window.

23. The recording and reproducing apparatus according to claim 20, wherein a label bonded to the recording medium is visible through the window.

24. The recording and reproducing apparatus according to claim 22, wherein the cover plate is provided to partially overlie the connector.

25. The recording and reproducing apparatus according to claim 22, wherein the connector includes a first connection terminal connected to a terminal unit of the recording medium and a second connection terminal electrically connected via the first connection terminal to the recording medium, wherein the cover plate is provided to overlie the second connection terminal.

26. The recording and reproducing apparatus according to claim 14, further comprising a controlling member for controlling movement of the holder from the first position to the second position until connection of the connector to the terminal unit of the recording medium.

27. The recording and reproducing apparatus according to claim 26, wherein the controlling member includes a controlling portion that engages with a mating engaging portion provided on a chassis in the main body housing to control the movement of the holder from the first position to the second position.

28. The recording and reproducing apparatus according to claim 26, wherein the controlling member does not control the holder after connection of the connector to the terminal unit.

29. The recording and reproducing apparatus according to claim 26, wherein the controlling member includes a projection engaged in a recess formed in the recording medium inserted in the holder, the projection being engaged in the recess to release the controlling of the holder to the first position.

30. The recording and reproducing apparatus according to claim 26, wherein: the controlling member includes a retainer portion that is rotatably provided on the holder and is biased in an engaging direction into engagement with a mating engaging portion in a chassis; a projection engaging with a front surface of the recording medium inserted into the holder; the projection being rotated in an other direction to cause the retainer portion to engage the mating engaging portion; and the projection rotating in the engaging direction as the recording medium is inserted in the holder and as the projection is engaged in a recess in the recording medium to re-release the engagement of the retainer portion with the mating engaging portion.

31. The recording and reproducing apparatus according to claim 26, wherein the controlling member includes a retainer portion that engages with a mating engaging portion formed in a chassis and a thrust portion thrust by an inserting end of the recording medium inserted into the holder, the retainer portion being disengaged from the mating engaging portion by the recording medium being inserted into the holder in the first position and by the thrust portion being thrust by the inserting end.

32. The recording and reproducing apparatus according to claim 31, wherein the controlling member is mounted rotatably in the holder and is biased in one direction; and the retainer portion is disengaged from the mating engaging portion by the thrust portion engaging with the inserting end of the recording medium inserted into the holder and by the thrust portion being rotated in an other direction.

33. The recording and reproducing apparatus according to claim 26, wherein the controlling member inhibits a release of the controlling on the holder when the recording medium is erroneously inserted into the holder.

34. The recording and reproducing apparatus according to claim 26, wherein the controlling member includes a hole engaged by a projection formed on a chassis.

35. The recording and reproducing apparatus according to claim 26, wherein the holder is connected to a chassis by a biasing member retained at one end by the chassis and being retained at an other end by the holder, said holder being biased by the biasing member towards the second position and after releasing the controlling by the controlling member is biased by the biasing member towards the first position.

36. The recording and reproducing apparatus according to claim 26, further comprising an ejection member movably provided on a chassis for operation by the ejection unit, wherein the holder is moved from the second position towards the first position by the ejection member being moved along an insertion direction of the recording medium.

37. The recording and reproducing apparatus according to claim 36, further comprising a rotary arm rotatably mounted on the chassis, wherein the rotary arm has an end thrust by the ejection member moved along an insertion direction of the recording medium such that an other end of the rotary arm moves the holder from the second position to the first position.

38. The recording and reproducing apparatus according claim 36, wherein the ejection member is biased in a direction of ejecting the recording medium loaded in the main body portion.

39. The recording and reproducing apparatus according to claim 14, further comprising a lid for opening and closing a front side of a chassis where the recording medium is inserted and ejected.

40. The recording and reproducing apparatus according to claim 39, wherein the lid includes a closure portion for closing the front side of the chassis and a rotary supporting portion for rotationally supporting the closure portion relative to the chassis.

41. The recording and reproducing apparatus according to claim 40, wherein the lid is biased in a closure direction by a biasing member having one end retained by the chassis and an opposite end retained by the rotary supporting portion.

42. The recording and reproducing apparatus according to claim 40, further comprising an ejection member movably supported by the chassis, wherein the lid is thrust by the ejection member moved along an insertion direction of the recording medium so as to be rotated in an opening direction.

43. The recording and reproducing apparatus according to claim 42, wherein the lid is rotated in an opening direction by a projection formed on the rotary supporting portion being thrust by a cam formed on the ejection member moved in the insertion direction of the recording medium.

44. The recording and reproducing apparatus according to claim 14, wherein the connector is provided with a mistaken insertion preventative portion that engages a recess formed in the recording medium when the recording medium is inserted in a regular state.

45. A method for loading a recording medium, comprising the steps of:
loading the recording medium on a main body housing of an apparatus, wherein the housing has a rectangular parallelepiped shape;
selecting data recorded on the recording medium by operating a selection operating unit located at a side of the main body housing, and reproducing the selected data; and
ejecting the loaded recording medium by operating an ejecting portion located at said side of the main body housing.

46. The loading method according to claim 45, wherein in the selecting and reproducing step the selecting operating unit is moved in a direction perpendicular to a surface of said side of the main body housing and is rotated.

47. The loading method according to claim 45, wherein in the ejecting step the ejection unit is moved in a direction parallel to a a longitudinal axis of said side of the main body portion.

48. The loading method according to claim 45, wherein in the ejecting step the ejection unit is moved in an inserting direction of the recording medium into the main body housing to eject the recording medium loaded on the main body housing.

49. The loading method according to claim 45, wherein said side of the main body portion whereat the ejecting unit is located is a first side and wherein a recording medium insertion and ejection opening for insertion and ejection of the recording medium is located at a second side of the main body housing adjacent said first side; and further comprising the step of introducing the recording medium into the insertion and ejection opening of the main body housing.

50. The loading method according to claim 49, further comprising the step of displaying information pertinent to data stored in the recording medium on a display unit provided on a third side forming a top surface of the main body housing.

51. The loading method according to claim 50, further comprising the step of causing a portion of the loaded recording medium to be visible through a window provided in a fourth side forming a bottom surface of the main body.

52. The loading method according to claim 51, further comprising the step of covering a connection terminal for electrical connection to the recording medium in the main body housing by a cover plate and exposing the connection terminal to an exterior via the window.

53. The loading method according to claim 51, wherein in the step of causing the portion of the recording medium to be visible includes the step of exposing a label affixed to the recording medium to an exterior through the window.

54. The loading method according to claim 52, further comprising the step of loading the recording medium from a first position of inserting and ejecting the recording medium to a second position of housing the recording medium such that the recording medium is connected to the connection terminal, wherein in the step of exposing the cover plate the cover plate covers the connection terminal.

55. The loading method according to claim 45, wherein the step of loading the recording medium on the main body portion further includes the steps of: inserting the recording medium into a holder; controlling the holder to a first position; connecting a terminal portion of the recording medium to a connector provided on the holder; releasing the control simultaneously with the connection; and releasing the control to start movement towards a second position of housing the holder holding the recording medium.

56. The loading method according to claim 55, where the controlling step includes the steps of: rotating a control member by the inserted recording medium; and controlling the holder to a first position by the rotated recording medium engaging with a chassis.

57. The loading method according to claim 55, wherein the releasing step includes the step of engaging a recess of the recording medium with a projection on the controlling member with the connection to release the control.

58. The loading method according to claim 57, further comprising the step of biasing the holder in the direction of ejecting said recording medium following the step of releasing the control on the holder in the direction of insertion of the recording medium.

59. The loading method according to claim 58, wherein the holder is moved to the second position by a biasing force in the direction of insertion of the recording medium.

60. The loading method according to claim 55, further comprising the steps of moving the ejection member in an inserting direction of the recording medium; and moving the holder holding the recording medium in the second position towards the first position with movement of the ejection member.

61. The loading method according to claim 60, wherein the holder moving step includes the steps of: causing a rotation of a rotary member located on the chassis by having an end thrust by the moving ejection member; and starting movement of the holder from the second position to the first position by an opposing end of the rotary member thrusting the holder holding the recording medium.

62. The loading method according to claim 60, wherein the holder moving step includes the steps of: biasing the holder biased in the inserting direction of the recording medium in a direction of ejecting the recording medium; and a step of moving the holder holding the recording medium to the first position under a biasing force in the direction of ejecting the recording medium.

63. The loading method according to claim 45, wherein the step of loading the recording medium includes the steps of: inserting the recording medium into the holder; connecting a terminal unit of the recording medium to a connector provided on the holder; releasing control on the holder simultaneously with the connection; and releasing the control to cause movement of the holder holding the recording medium towards a second position as a housing position.

64. The loading method according to claim 63, wherein the step of releasing the control includes the steps of: connecting the terminal unit to the connector and causing rotation of a control member by the recording medium inserted; and disengaging the control member from a chassis by rotation of the control member.

65. The loading method according to claim 63, further comprising the steps of: biasing the holder biased in the ejecting direction of the recording medium in the direction of inserting the recording medium; and causing movement of the holder holding the recording medium to the second position by the biasing of said recording medium in the inserting direction.

66. A palm size recording and reproducing apparatus, comprising:
  a main body housing having a rectangular parallelepiped shape and on which a recording medium is removably loaded;
  a selection operation unit located at a side of the main body housing and operable by a thumb of a hand holding the main body housing to select data stored in the recording medium; and
  an ejecting operating unit located on the side of the main body housing where the selection operation unit is located for ejecting the loaded recording medium.

* * * * *